United States Patent
Chondro et al.

(10) Patent No.: US 10,699,430 B2
(45) Date of Patent: Jun. 30, 2020

(54) DEPTH ESTIMATION APPARATUS, AUTONOMOUS VEHICLE USING THE SAME, AND DEPTH ESTIMATION METHOD THEREOF

(71) Applicant: Industrial Technology Research Institute, Hsinchu (TW)

(72) Inventors: Peter Chondro, Hsinchu County (TW); Wei-Hao Lai, New Taipei (TW); Pei-Jung Liang, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 127 days.

(21) Appl. No.: 16/154,738

(22) Filed: Oct. 9, 2018

(65) Prior Publication Data

US 2020/0111225 A1    Apr. 9, 2020

(51) Int. Cl.
*G06K 9/00* (2006.01)
*G06T 7/593* (2017.01)
(Continued)

(52) U.S. Cl.
CPC ........... *G06T 7/593* (2017.01); *G05D 1/0088* (2013.01); *G05D 1/0251* (2013.01); *G06T 7/10* (2017.01);
(Continued)

(58) Field of Classification Search
CPC . G06T 7/593; G06T 7/10; G06T 2207/10028; G06T 2207/30252; G05D 1/0088; G05D 1/0251; G05D 2201/0213
See application file for complete search history.

(56) References Cited

U.S. PATENT DOCUMENTS

| 8,447,141 B2 | 5/2013 | Barenbrug |
| 9,906,793 B2 | 2/2018 | Fu et al. |

(Continued)

FOREIGN PATENT DOCUMENTS

| CN | 106162147 | 11/2016 |
| CN | 104346608 | 9/2017 |

(Continued)

OTHER PUBLICATIONS

Courtois; Hugo et al. "Fusion of stereo and Lidar data fordense depth map computation," Workshop on Research, Education and Development of Unmanned Aerial Systems (RED-UAS), Oct. 3-5, 2017, pp. 186-191.

(Continued)

*Primary Examiner* — Dhaval V Patel
(74) *Attorney, Agent, or Firm* — JCIPRNET

(57) ABSTRACT

In one of the exemplary embodiments, the disclosure is directed to a depth estimation apparatus including a first type of sensor for generating a first sensor data; a second type of sensor for generating a second sensor data; and a processor coupled to the first type of sensor and the second type of sensor and configured at least for: processing the first sensor data by using two stage segmentation algorithms to generate a first segmentation result and a second segmentation result; synchronizing parameters of the first segmentation result and parameters of the second sensor data to generate a synchronized second sensor data; fusing the first segmentation result, the synchronized second sensor data, and the second segmentation result by using two stage depth estimation algorithms to generate a first depth result and a second depth result.

22 Claims, 25 Drawing Sheets

(51) Int. Cl.
  G06T 7/10 (2017.01)
  G05D 1/02 (2020.01)
  G05D 1/00 (2006.01)
(52) U.S. Cl.
  CPC ........... *G05D 2201/0213* (2013.01); *G06T 2207/10028* (2013.01); *G06T 2207/30252* (2013.01)

(56) References Cited

U.S. PATENT DOCUMENTS

| 2013/0095920 | A1  | 4/2013  | Patiejunas et al. |
| 2014/0055560 | A1* | 2/2014  | Fu ................... G06T 5/005 348/42 |
| 2015/0120241 | A1  | 4/2015  | Kadambi et al. |
| 2015/0381972 | A1  | 12/2015 | Kowdle et al. |
| 2017/0193672 | A1* | 7/2017  | Bhardwaj .......... G06K 9/00208 |
| 2018/0101932 | A1  | 4/2018  | Kwon et al. |

FOREIGN PATENT DOCUMENTS

| CN | 107767357  | 3/2018  |
| JP | 2014106543 | 6/2014  |
| JP | 2015096812 | 5/2015  |
| JP | 2018526641 | 9/2018  |
| TW | I225222    | 12/2004 |
| TW | I430150    | 3/2014  |
| TW | I509560    | 11/2015 |
| TW | I579797    | 4/2017  |
| TW | 201721514  | 6/2017  |
| WO | 2012056686 | 5/2012  |

OTHER PUBLICATIONS

Liu; Li-Wei et al. "ToF Depth Map guided Passive Stereobased on KNN searching," IEEE International Conference on Wireless Communications and Signal Processing, Oct. 24-26, 2013, pp. 1-5.

Duan; Yong et al. "Probabilistic depth map fusion of Kinectand stereo in real-time," Proceedings of the 2012 IEEE International Conference on Robotics and Biomimetics, Dec. 11-14, 2012, pp. 2317-2322.

Kuznietsov; Yevhen et al. "Semi-supervised deep learning formonocular depth map prediction," IEEE International Conference on Computer Vision and Pattern Recognition, Jul. 21-26, 2017, pp. 1-14.

Ma; Fangchang et al. "Sparse-to-Dense: Depth Prediction from Sparse Depth Samples and a Single Image," IEEE International Conference on Robotics and Automation, May 21-25, 2018, pp. 1-8.

Uhrig; Jonas et al. "Sparsity Invariant CNNs," International Conference on 3D Vision (3DV), Oct. 2017, pp. 1-16.

"Office Action of Taiwan Counterpart Application," dated Oct. 1, 2019, p. 1-p. 5.

"Office Action of Japan Counterpart Application," dated Dec. 3, 2019, p. 1-p. 4.

* cited by examiner 16-beams     64-beams

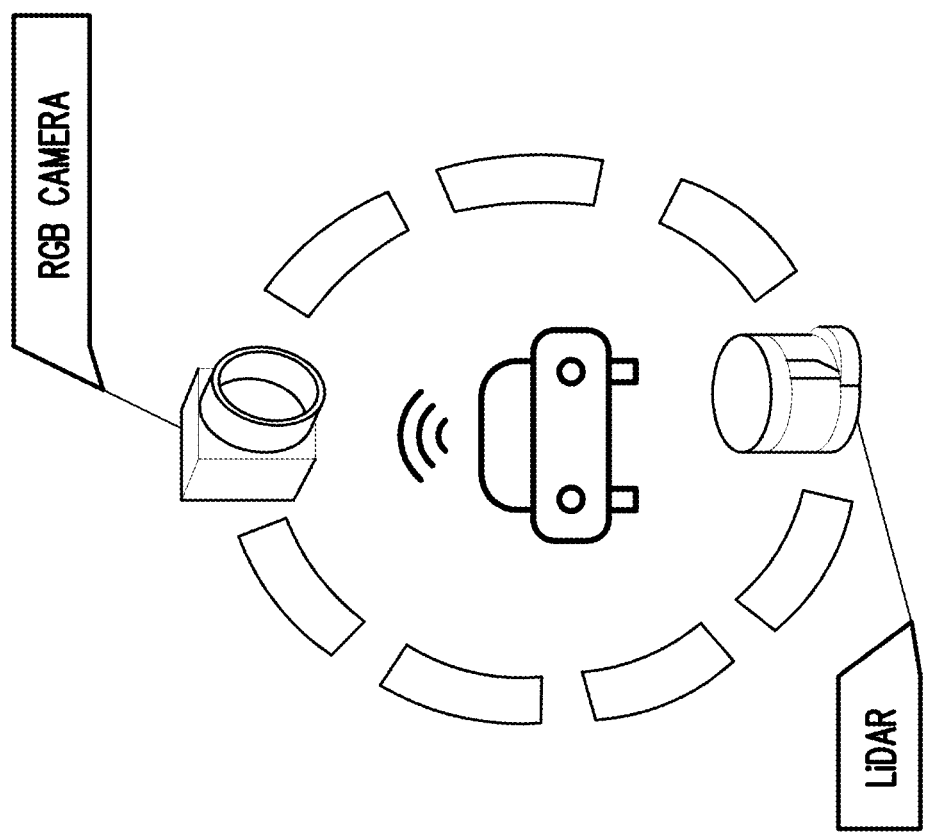

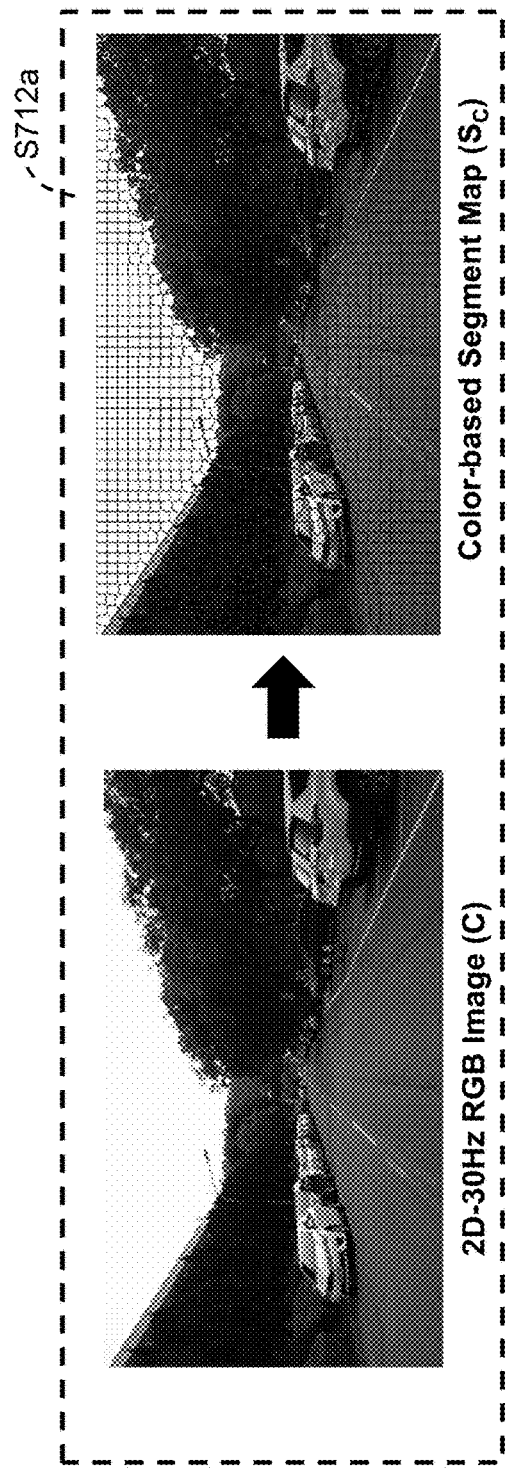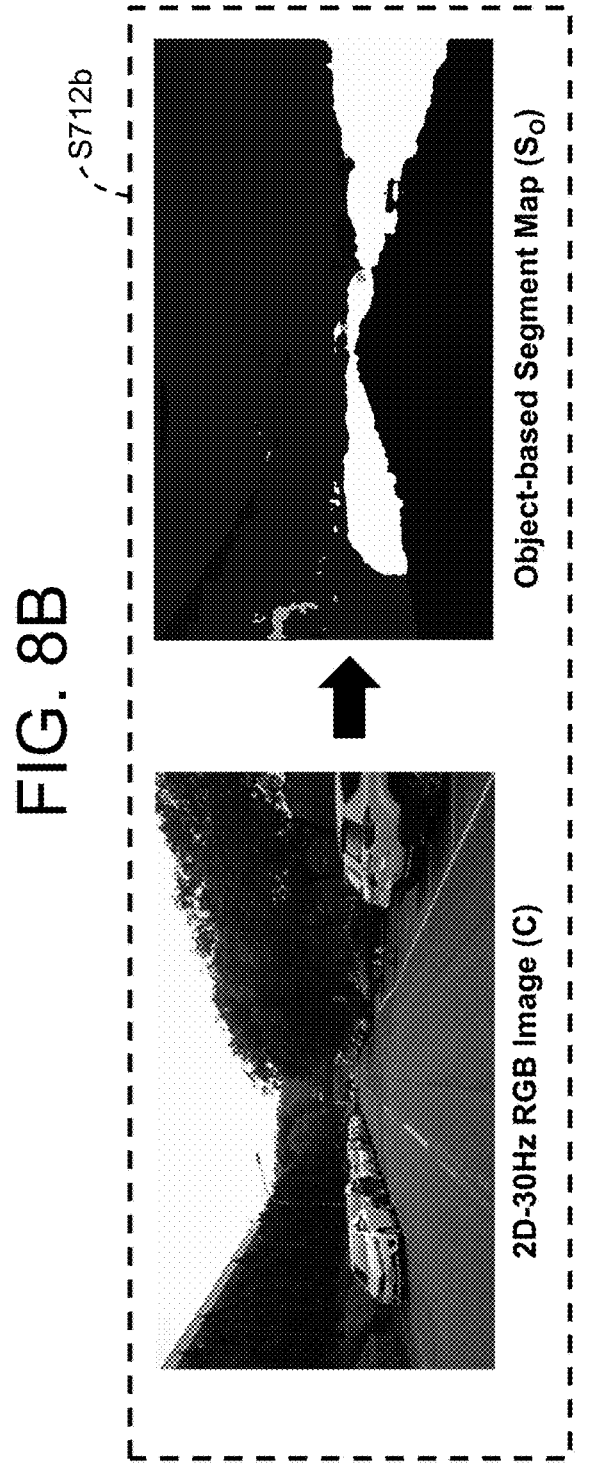

DEPTH ESTIMATION APPARATUS, AUTONOMOUS VEHICLE USING THE SAME, AND DEPTH ESTIMATION METHOD THEREOF

TECHNICAL FIELD

The disclosure is directed to a depth estimation apparatus used by an autonomous vehicle, an autonomous vehicle using the same apparatus, and a depth estimation method thereof.

BACKGROUND

In the development of the autonomous vehicle, sensing devices are essential components for future autonomous vehicles. Various sensing devices could be integrated for providing more reliable sensing data and more precise information of a surrounding within any type of environment. Although various object detection techniques may reliably and accurately detect designated objects, inconsistent sensor performances over diversified sensing modalities within different environments may decimate the performance of most of existing detection techniques which are simultaneously used but sub-optimally integrated when a process of performing synchronized data acquisition.

Because of current limitations in hardware restricted detection performances, detection techniques would experience various difficulties. For example, less than reliable detection results may occur for an object in a high speed velocity due to low data sampling rate. Using uniform specifications on the detection results may result in including pixels that are not part of the objects to be detected as a detected object(s) due to operation in the lowest coordinate system. Fine path planning may miss detected object(s) due to operations in the lowest data resolution.

FIG. 1A illustrates various sensors which could be used to generate a depth map. Such sensors may include not limited to a LiDAR, a Stereo Camera, and a time-of-flight camera (ToF Camera). In further detail, Table 1 shows a comparison of characteristics among the sensors that can produce depth information of surroundings of an autonomous vehicle. Values shown in Table 1 are only shown for exemplary purposes as specific values may vary based on design considerations.

TABLE 1

| Constraints | LiDAR | Stereo Camera | ToF Camera |
| --- | --- | --- | --- |
| sensor type | active | passive | active + passive |
| effective range | 100 meters | $\frac{f_{cam} \times l_{base}}{disparity}$ | 10 meters |
| accuracy | high | low | moderate |
| resolution | sparse | dense | mid-dense |
| field of view | 360 degrees | ≤360 degrees | ≤360 degrees |
| sampling rate | moderate | slow | moderate |

According to Table 1 and the prior elaboration, the state of the art sensors for depth sensing could be achieved by a LiDAR sensor which typically has a 360 degrees field of view, the farthest detection range, and the highest depth accuracy in comparison to the other instruments such as a stereo camera or a ToF camera. The data resolution and the sampling rate of a LiDAR, however, could be limited based on the several factors.

For example, the number of beams used to acquire depth volume could be limited. FIG. 1B illustrates a comparison between low resolution LiDAR data and high resolution LiDAR data. The low resolution LiDAR data is, for example, a projected point cloud volume taken by LiDARs with a fewer number of laser beams (e.g. 16-beams), and the high resolution LiDAR data is, for example, a projected point cloud volume taken by LiDARs with a greater number of laser beams (e.g. 64-beams). Among the current version of various LiDAR transducers, trade-off relationships could be apparent; for example, more affordable LiDARs would have fewer number of beams (i.e. 16-beams LiDAR illustrated in FIG. 1B), and a fewer number of beams in LiDARs would generate a fewer number of points/seconds, yet a fewer number of beams LiDAR would consume less power. With these trade-offs, there could be a few possible implications including, for example, difficulties to recognize object with sparse point clouds because of fewer point clouds acquired as the corresponding object speeds up (as illustrated in FIG. 1B).

Among the current version of various LiDAR transducers, trade-off relationships could be apparent, for example, nearer objects may have more point clouds, and smaller-sized objects may have fewer point clouds. With these trade-offs, there are few possible implications including, for example, difficulties to recognize smaller-sized objects since the number of point clouds would be extremely low for meaningful analysis, and there could be even fewer point clouds to be acquired as the corresponding object speeds up.

Based on the aforementioned trade-off relationships, a depth up-sampling method which increases detection reliability by a transformation from sparse point clouds to dense point clouds could be essential. There could be a few goals that can be achieved from a depth up-sampling technique. For example, more precise path planning could be achieved since each pixel could take on a depth value as detection results could be more finely segmented rather than just using a bounding box. Also, better detection accuracy could be achieved by using a dense depth map-the detection algorithm which may more reliably detect objects despite the object's relative position, size, or velocity (i.e. acceleration). The overall system could be affordable system since the depth up-sampling may enable the utilization of a dense depth map acquired from low-cost LiDARs rather than utilizing a depth map acquired from high-end LiDARs.

SUMMARY OF THE DISCLOSURE

Accordingly, the disclosure is directed to a depth estimation apparatus used by an autonomous vehicle, an autonomous vehicle using the same apparatus, and a depth estimation method thereof.

In one of the exemplary embodiments, the disclosure is directed to a depth estimation apparatus which would include not limited to: a first type of sensor for generating a first sensor data; a second type of sensor for generating a second sensor data; and a processor coupled to the first type of sensor and the second type of sensor and configured at least for: processing the first sensor data by using a first segmentation algorithm to generate a first segmentation result and by using a second segmentation algorithm to generate a second segmentation result; synchronizing parameters of the first segmentation result and parameters of the second sensor data by using a data alignment algorithm to generate a synchronized second sensor data which includes a plurality of segments, wherein a part of the plurality of segments include a plurality of point clouds;

fusing the first segmentation result and the synchronized second sensor data by using a first depth estimation algorithm to generate a first depth result; and fusing the second segmentation result and the first depth result by using a second depth estimation algorithm to generate a second depth result.

In one of the exemplary embodiments, the disclosure is directed to an autonomous vehicle which includes not limited to: a depth estimation apparatus including a first type of sensor for generating a first sensor data; a second type of sensor for generating a second sensor data; and a processor coupled to the first type of sensor and the second type of sensor and configured at least for: processing the first sensor data by using a first segmentation algorithm to generate a first segmentation result and by using a second segmentation algorithm to generate a second segmentation result; synchronizing parameters of the first segmentation result and parameters of the second sensor data by using a data alignment algorithm to generate a synchronized second sensor data which includes a plurality of segments, wherein a part of the plurality of segments include a plurality of point clouds; fusing the first segmentation result and the synchronized second sensor data by using a first depth estimation algorithm to generate a first depth result; and fusing the second segmentation result and the first depth result by using a second depth estimation algorithm to generate a second depth result.

In one of the exemplary embodiments, the disclosure is directed to a depth estimation method used by an autonomous vehicle, the method would include not limited to: generating, by using a first type of sensor, a first sensor data; generating, by using a second type of sensor, a second sensor data; processing the first sensor data by using a first segmentation algorithm to generate a first segmentation result and by using a second segmentation algorithm to generate a second segmentation result; synchronizing parameters of the first segmentation result and parameters of the second sensor data by using a data alignment algorithm to generate a synchronized second sensor data which includes a plurality of segments, wherein a part of the plurality of segments include a plurality of point clouds; fusing the first segmentation result and the synchronized second sensor data by using a first depth estimation algorithm to generate a first depth result; and fusing the second segmentation result and the first depth result by using a second depth estimation algorithm to generate a second depth result.

In order to make the aforementioned features and advantages of the disclosure comprehensible, exemplary embodiments accompanied with figures are described in detail below. It is to be understood that both the foregoing general description and the following detailed description are exemplary and are intended to provide further explanation of the disclosure as claimed.

It should be understood, however, that this summary may not contain all of the aspect and embodiments of the disclosure and is therefore not meant to be limiting or restrictive in any manner. Also, the disclosure would include improvements and modifications which are obvious to one skilled in the art.

BRIEF DESCRIPTION OF THE DRAWINGS

The accompanying drawings are included to provide a further understanding of the disclosure and are incorporated in and constitute a part of this specification. The drawings illustrate embodiments of the disclosure and, together with the description, serve to explain the principles of the disclosure.

FIG. 6A~6F illustrates an implementation example of the depth estimation method in accordance with one of the exemplary embodiments of the disclosure.

FIG. 8B illustrates a first segmentation algorithm in accordance with one of the exemplary embodiments of the disclosure.

FIG. 8C illustrates a second segmentation algorithm in accordance with one of the exemplary embodiments of the disclosure.

DETAILED DESCRIPTION OF DISCLOSED EMBODIMENTS

Figure 1A:
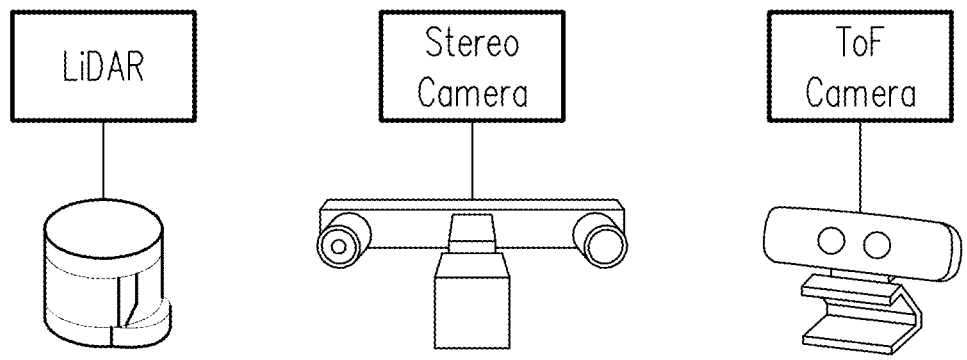
FIG. 1A illustrates possible instruments of commonly used to generate depth map.
Figure 1B:
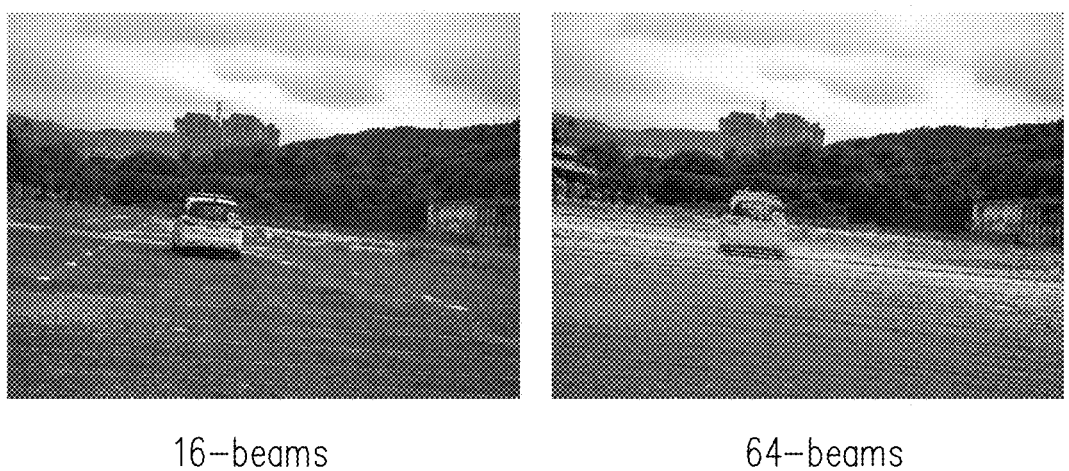
FIG. 1B illustrates comparison between low resolution LiDAR data and high resolution LiDAR data.

Reference will now be made in detail to the present exemplary embodiments of the disclosure, examples of which are illustrated in the accompanying drawings. Wherever possible, the same reference numbers are used in the drawings and the description to refer to the same or like parts.

The disclosure provides a framework for an autonomous vehicle to estimate depth map of a designated field of view (FOV) of an autonomous vehicle, and the framework is to be explained from the perspective of a depth estimation apparatus, an autonomous vehicle that uses the depth estimation apparatus, and a depth estimation method. The apparatus could be disposed within an autonomous vehicle which would operate automatically without any human intervention and thus estimating a high-resolution depth map to vehicle to perform sensing and control functions would be paramount. The apparatus would include not limited to multiple sets of different sensing devices with overlapping FOVs such as a set of imaging devices having one or more image sensors for acquiring two dimensional (2D) RGB data from the surroundings, a set of LiDAR transducers having one or more LiDAR transducers for acquiring three dimensional (3D) point clouds volume from the surrounding, and a processing unit configured at least to execute an image rectification algorithm, an occlusion correlation algorithm, a data alignment algorithm, a set of segmentation algorithm, and a set of depth estimation algorithm for each type of sensor to generate a high-resolution depth map. Through the provided framework, a resolution of a depth map could be increased so as to improve the accuracy of the high-resolution depth map. FIG. 2~FIG. 5 elucidates the provided depth estimation framework with further details.

Figure 2:
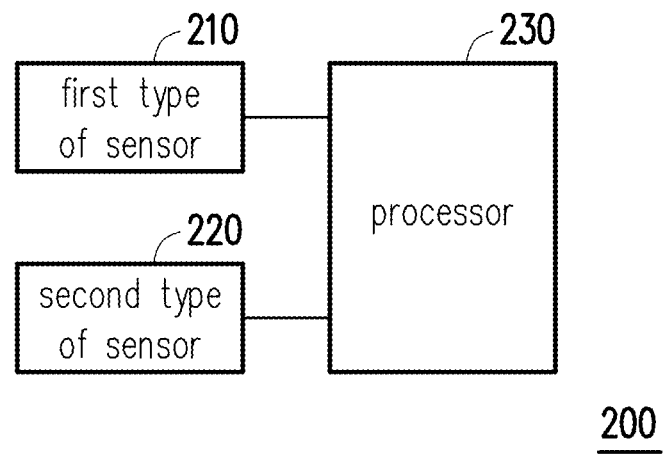
FIG. 2 illustrates a hardware block diagram of a depth estimation apparatus in accordance with one of the exemplary embodiments of the disclosure.

FIG. 2 illustrates a hardware block diagram of a depth estimation apparatus in accordance with one of the exemplary embodiments of the disclosure. The depth estimation apparatus 200 would include not limited to a first type of sensor 210, a second type of sensor 220, and a processor 230. The first type of sensor 210 could be an imaging sensor such as an RGB image sensor that captures visible light within a designated FOV into a 2D image. The second type of sensor 220 could be an imaging and ranging transducer such as a LiDAR transducer that samples reflected signals from within a designated FOV and reconstruct a 3D volume accordingly. The processor 230 would be configured at least for processing the first sensor data by using a first segmentation algorithm to generate a first segmentation result and by using a second segmentation algorithm to generate a second segmentation result.

The processor 230 would then be configured for synchronizing parameters of the first segmentation result and parameters of the second sensor data by using a data alignment algorithm to generate a synchronized second sensor data which includes a plurality of segments, wherein a part of the plurality of segments may include a plurality of point clouds. It is noted that in other embodiment, it could be each of the plurality of segments include a plurality of point clouds, the persons skilled in the art can adaptively adjust according to actual situations and requirements. After that, the processor 230 would be configured for fusing the first segmentation result and the synchronized second sensor data by using a first depth estimation algorithm to generate a first depth result. At last, the processor 230 would be configured for fusing the second segmentation result and the first depth result by using a second depth estimation algorithm to generate a second depth result. In this manner, this disclosure improves a resolution of a depth map by two stage segmentation algorithms, data alignment algorithm and two stage depth estimation algorithms.

Figure 3:
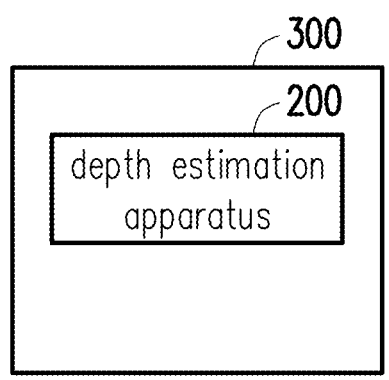
FIG. 3 illustrates an autonomous vehicle which uses a depth estimation apparatus in accordance with one of the exemplary embodiments of the disclosure.

FIG. 3 illustrates an autonomous vehicle which uses a depth estimation apparatus in accordance with one of the exemplary embodiments of the disclosure. The autonomous vehicle 300 would include not limited to the depth estimation apparatus 200 as shown in FIG. 2.

Figure 4:
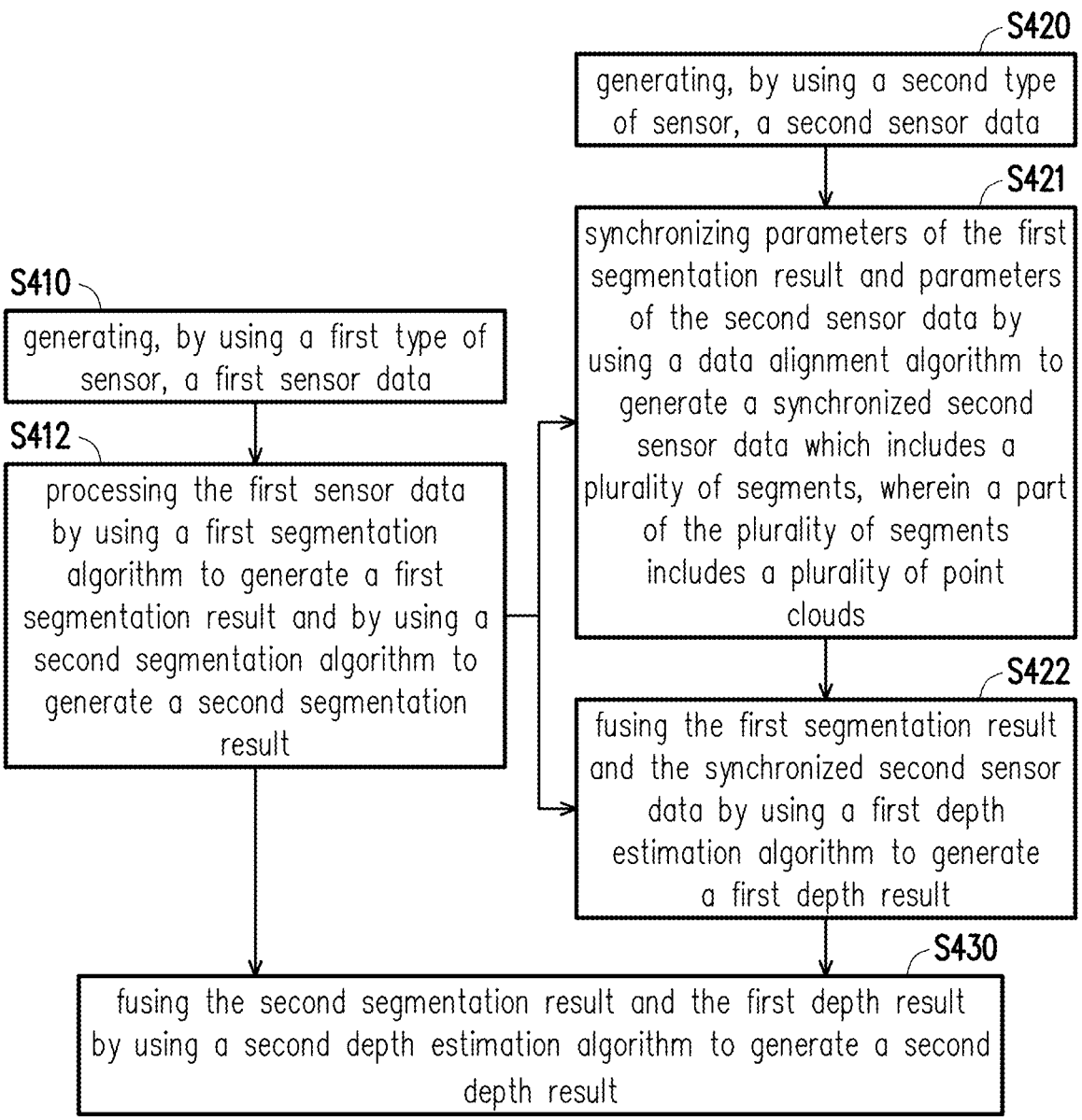
FIG. 4 is a flow chart which illustrates steps of a depth estimation method in accordance with one of the exemplary embodiments of the disclosure.

FIG. 4 is a flow chart which illustrates steps of a depth estimation method in accordance with one of the exemplary embodiments of the disclosure. In step S410, the depth estimation apparatus would generate, by using a first type of sensor, a first sensor data. In step S420, the depth estimation apparatus would generate, by using a second type of sensor, a second sensor data. In step S412, the depth estimation apparatus would process the first sensor data by using a first segmentation algorithm to generate a first segmentation result and by using a second segmentation algorithm to generate a second segmentation result.

In detail, the step of processing the first sensor data by using the first segmentation algorithm (i.e. step S412) comprises: processing the first sensor data by using the first segmentation algorithm based on color information of the first sensor data; otherwise. The step of processing the first sensor data by using the second segmentation algorithm (i.e. step S412) comprises: processing the first sensor data by using the second segmentation algorithm based on object information of the first sensor data.

In step S421, the depth estimation apparatus would synchronize parameters of the first segmentation result and parameters of the second sensor data by using a data alignment algorithm to generate a synchronized second sensor data which includes a plurality of segments, wherein a part of the plurality of segments may include a plurality of point clouds. It is noted that in other embodiment, it could be each of the plurality of segments include a plurality of point clouds, the persons skilled in the art can adaptively adjust according to actual situations and requirements. In step S422, the depth estimation apparatus would fuse the first segmentation result and the synchronized second sensor data by using a first depth estimation algorithm to generate a first depth result. At last, the depth estimation apparatus would fuse the second segmentation result and the first depth result by using a second depth estimation algorithm to generate a second depth result in step S430.

Figure 5:
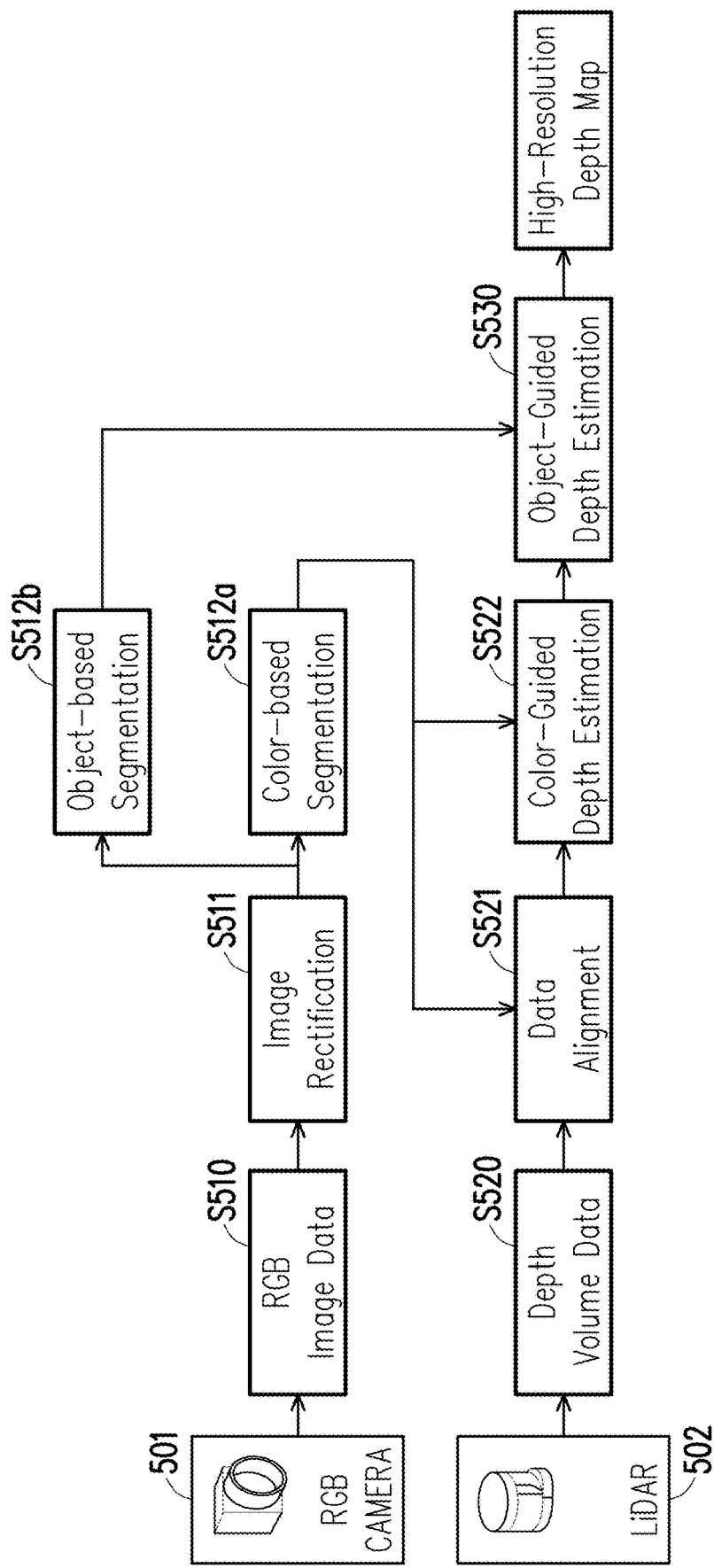
FIG. 5 illustrates a block diagram of the depth estimation framework in accordance with one of the exemplary embodiments of the disclosure.

FIG. 5~FIG. 15B elucidates the provided depth estimation framework with several exemplary embodiments and examples. FIG. 5 illustrates a block diagram of the depth estimation framework in accordance with one of the exemplary embodiments of the disclosure. FIG. 6A~6F illustrates an implementation example of the depth estimation method in accordance with one of the exemplary embodiments of the disclosure. With reference to FIG. 5 and FIG. 6A~6F, the framework to be described would include a depth estimation apparatus that utilizes multiple types of sensing devices (e.g. a RGB camera and a LiDAR transducer illustrated in FIG. 6A) to perform depth estimations by using multiple algorithms for each type of sensing devices over the overlapping FOVs (as illustrated in FIG. 6B), wherein the FOV distance of the RGB camera is 100 meters and the FOV degree of the LiDAR sensor is 360 degrees. The multiple types of sensing devices may include a first type of sensor (e.g. RGB camera array 501 illustrated in FIG. 5) and a second type of sensor (e.g. LiDAR transducer array 502 illustrated in FIG. 5).

To be more specific, the RGB camera array 501 takes an image within a field of view of the autonomous vehicle and generates a first sensor data (e.g. RGB image data) accordingly (i.e. RGB Image Data step S510). The LiDAR transducer array 502 also takes a point cloud volume of a surrounding of the autonomous vehicle and generates a second sensor data (e.g. depth volume data) accordingly (i.e. Depth Volume Data step S520), wherein the depth volume data is a sparse depth data (as illustrated in FIG. 6D), in the detailed description, the terminology of sparse/dense refers to the resolution of image. A processor coupled to the RGB camera array 501 and the LiDAR transducer array 502, and the processor configured at least for processing the RGB image data and the depth volume data. In detail, the processor would process the RGB image data by using an image rectification algorithm to remove a spatial distortion of the RGB image data and the processor would generate a rectified first sensor data (e.g. rectified RGB image data illustrated in FIG. 6C) in Image Rectification step S511.

Figure 6B:
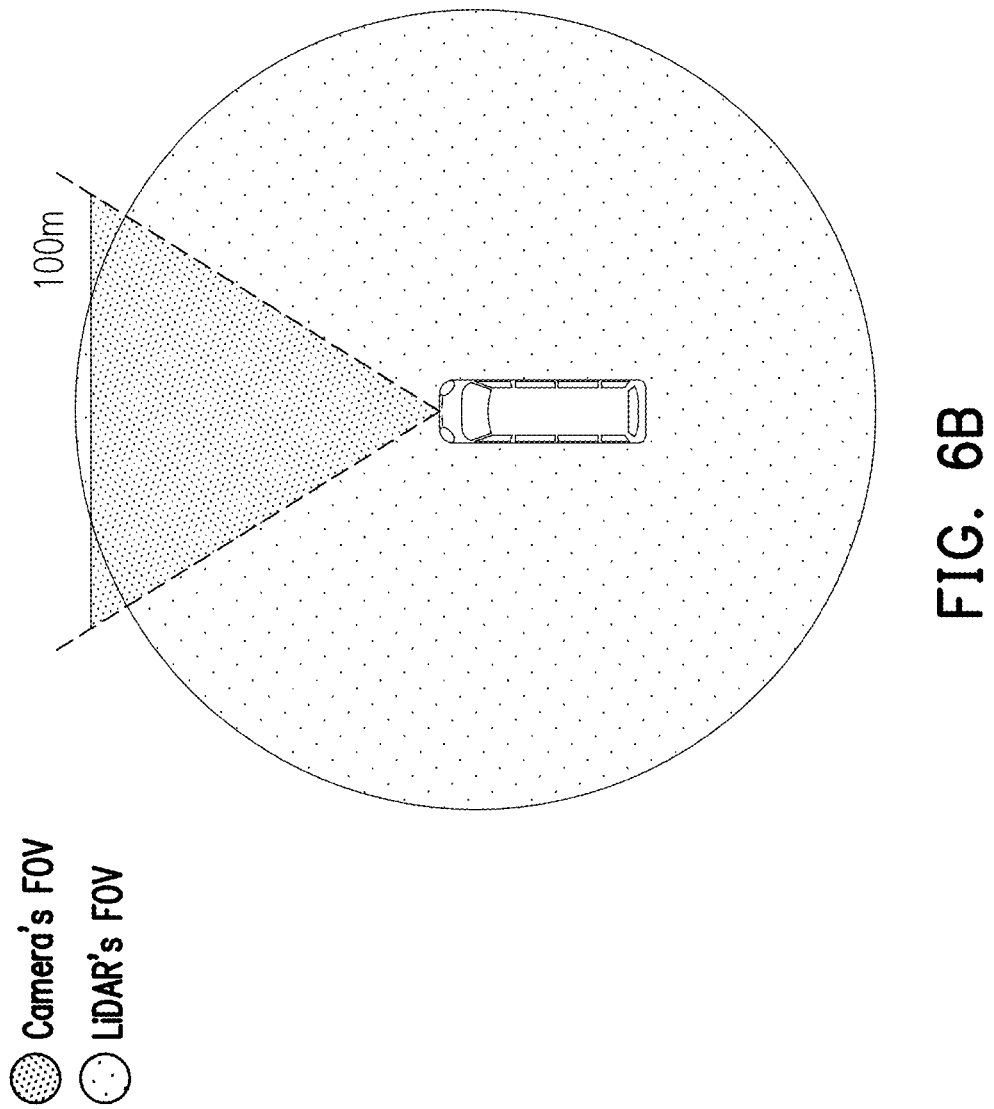
Figure 6C:
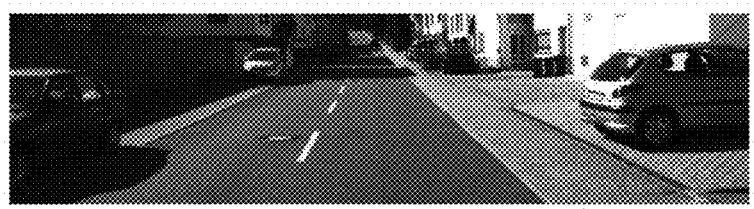
Figure 6D:
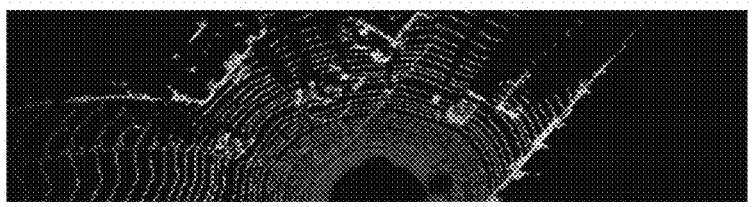

In Color-based Segmentation step S512a, the processor would process the rectified RGB image data (as illustrated in FIG. 6C) by using a first segmentation algorithm based on color information of the rectified RGB image data to generate a first segmentation result. In Object-based Segmentation step S512b, the processor would process the rectified RGB image data by using a second segmentation algorithm based on object information of the rectified RGB image data to generate a second segmentation result. In other words, the processor would segment the rectified RGB image based on color information of the rectified RGB image data to generate the first segmentation result, and the first segmentation result includes a plurality of segments. Furthermore, the processor would segment the rectified RGB image based on object information of the rectified RGB image data to generate the second segmentation result.

It is noted that in other embodiment, the processor could directly process the Color-based Segmentation step S512a and the Object-based Segmentation step S512b with the first sensor data (i.e. RGB image data) which is generated by the RGB camera array 501 in the RGB Image Data step S510, and no more limitation here, FIG. 5 is merely an example, and constructs no limitations to the present invention.

Figure 6E:
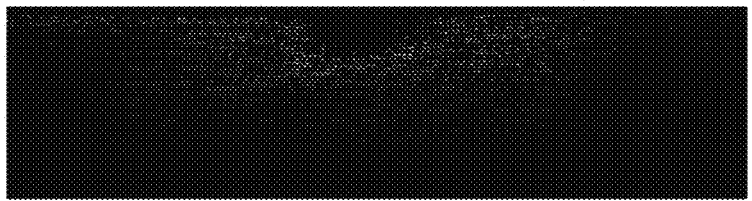
Figure 6F:
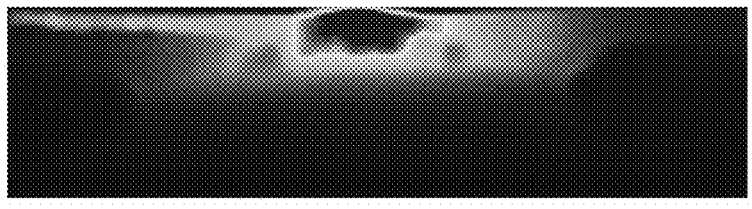

In Data Alignment step S521, the processor would synchronize parameters of the first segmentation result and parameters of the second sensor data by using a data alignment algorithm to generate a synchronized second sensor data. Additionally, the synchronized second sensor data includes a plurality of segments, wherein a part of the plurality of segments may include a plurality of point clouds, and the synchronized second sensor data is a sparse depth data (as illustrated in FIG. 6E). It is noted that in other embodiment, it could be a part of the plurality of segments include a plurality of point clouds, the persons skilled in the art can adaptively adjust according to actual situations and requirements. The processor would then fuse the first segmentation result and the synchronized second sensor data by using a first depth estimation algorithm to generate a first depth result in Color-Guided Depth Estimation step S522.

In other words, the processor would map the synchronized second sensor data to the first segmentation result based on the color information of the rectified RGB image data to generate the first depth result. In Object-Guided Depth Estimation step S530, the processor would then fuse the second segmentation result and the first depth result by using a second depth estimation algorithm to generate a second depth result (e.g. high-resolution depth map illustrated in FIG. 6F). That is, the processor would fuse the second segmentation result and the first depth result based on the color infonnation of the rectified RGB image data to generate the second depth result (i.e. the high-resolution depth map), wherein the high-resolution depth map is a dense depth data. In this manner, this disclosure improves a resolution of a depth map by the RGB camera array 501, the LiDAR transducer array 502 and the processor trough the image rectification algorithm, two stage segmentation algorithms, data alignment algorithm and two stage depth estimation algorithms.

Figure 7:
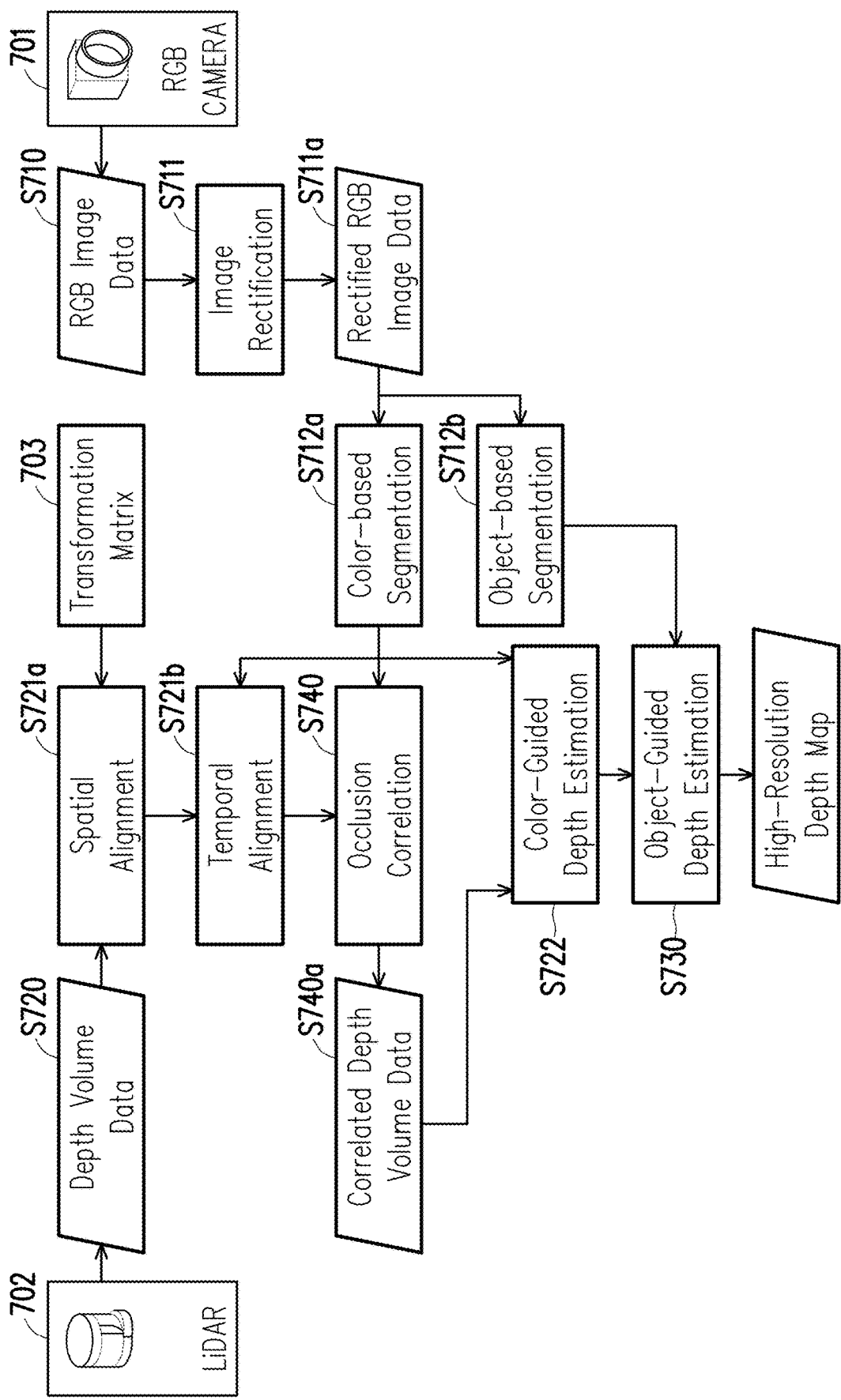
FIG. 7 illustrates a detailed block diagram of the depth estimation framework in accordance with one of the exemplary embodiments of the disclosure.

FIG. 7 illustrates a detailed block diagram of the depth estimation framework in accordance with one of the exemplary embodiments of the disclosure. In this embodiment, the multiple types of sensing devices may include a first type of sensor (e.g. RGB camera array 701) and a second type of sensor (e.g. LiDAR transducer array 702). The RGB camera array 701 takes an image nearby the autonomous vehicle and generates a first sensor data (e.g. RGB image data) accordingly (i.e. RGB Image Data step S710). The LiDAR transducer array 702 takes an image nearby the autonomous vehicle and generates a second sensor data (e.g. depth volume data) accordingly (i.e. Depth Volume Data step S720), wherein the depth volume data is a sparse depth data. A processor coupled to the RGB camera array 701 and the LiDAR transducer array 702, and the processor configured at least for processing the RGB image data and the depth volume data.

Figure 8A:
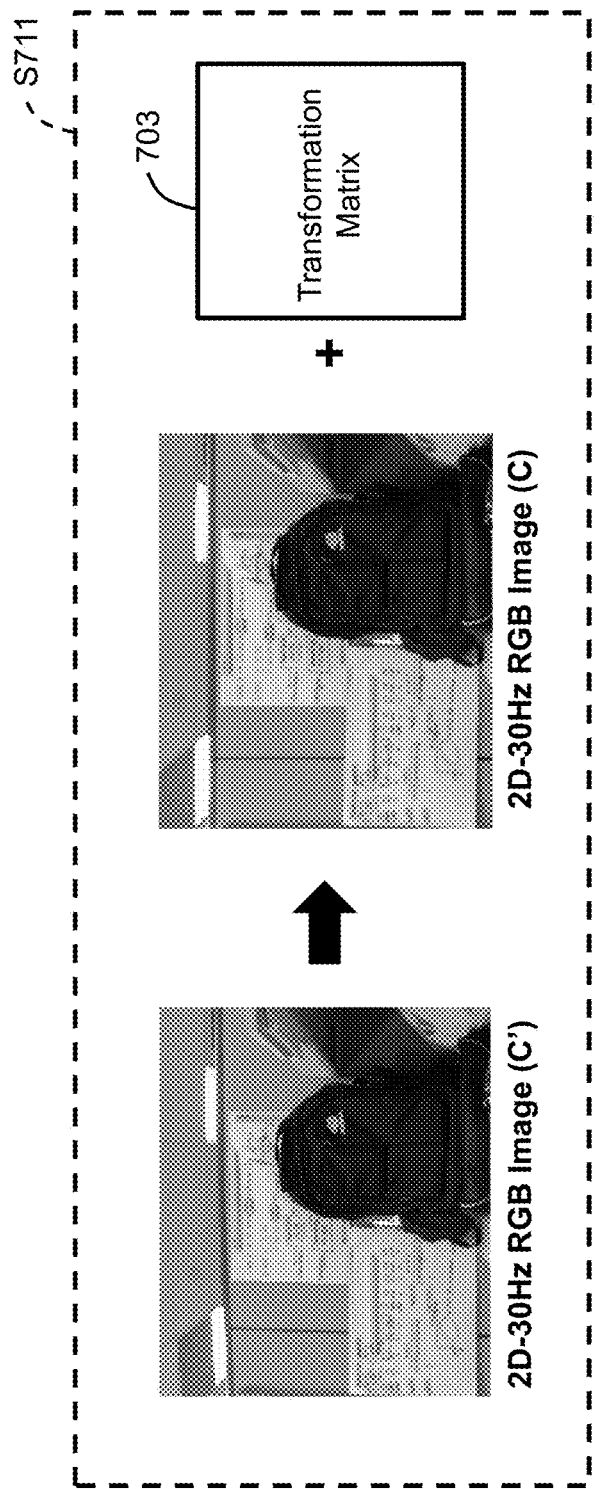
FIG. 8A illustrates an image rectification algorithm in accordance with one of the exemplary embodiments of the disclosure.

In the detailed description, FIG. 8A illustrates an image rectification algorithm in accordance with one of the exemplary embodiments of the disclosure. With reference to FIG. 7 and FIG. 8A, the processor would process the RGB image data by using an image rectification algorithm (i.e. Image Rectification step S711 illustrated in FIG. 7 and FIG. 8A) to remove a spatial distortion of the RGB image data, and the processor would generate a rectified first sensor data (e.g. rectified RGB image data) in Rectified RGB Image Data step S711a. To be more specific, the processor would remove a spatial distortion of the RGB image data (e.g. 2D-30 Hz RGB image (C') illustrated in FIG. 8A) which is caused by a lens effect. For example, the backplane in the 2D-30 Hz RGB image (C') is curved (i.e. distortion phenomenon). The processor would remove the spatial distortion of the 2D-30 Hz RGB image (C') and generate the rectified first sensor data (e.g. 2D-30 Hz RGB image (C) illustrated in FIG. 8A) with a transformation matrix 703, wherein a backplane in the 2D-30 Hz RGB image (C) become flat.

After that, FIG. 8B illustrates a first segmentation algorithm in accordance with one of the exemplary embodiments of the disclosure. FIG. 8C illustrates a second segmentation algorithm in accordance with one of the exemplary embodiments of the disclosure. With reference to FIG. 7, FIG. 8B, and FIG. 8C, the processor would process the rectified RGB image data by using a first segmentation algorithm (i.e. Color-based Segmentation step S712a illustrated in FIG. 7 and FIG. 8B) based on color information of the rectified RGB image data to generate a first segmentation result. To be more specific, the processor would analyze the rectified RGB image data (e.g. 2D-30 Hz RGB image (C) illustrated in FIG. 8B) and identify similar planes of the 2D-30 Hz RGB image (C) based on the color information of the 2D-30 Hz RGB image (C), wherein the color information includes hue (i.e. color), saturation (i.e. color strength), and value (i.e. luminance).

The processor then would classify all pixels in the 2D-30 Hz RGB image (C) into region-wise segments based on the color information. The processor would segment the 2D-30 Hz RGB image (C) to generate the first segmentation result (i.e. Color-based Segment Map ($S_c$) illustrated in FIG. 8B) which includes a plurality of segments. All pixels in the 2D-30 Hz RGB image (C) are segmented on different regions based on the color information. The first segmentation result (i.e. Color-based Segment Map ($S_c$)) is denoted as a plurality of segmentations SEG. Each of segmentations SEG relies set of RGB pixels from the 2D-30 Hz RGB image (C) with similar classifying qualifiers. The first segmentation algorithm is, for example, a simple linear iterative clustering (SLIC) technique.

In the meantime, the processor would process the rectified RGB image data by using a second segmentation algorithm (i.e. Object-based Segmentation step S712b illustrated in FIG. 7 and FIG. 8C) based on object information of the rectified RGB image data to generate a second segmentation result (e.g. Object-based Segment Map ($S_o$) illustrated in FIG. 8C) To be more specific, the processor would classify all pixels in the rectified RGB image (e.g. 2D-30 Hz RGB image (C) illustrated in FIG. 8C) into region—wise segments based on the object information. An object-oriented map could help to identify the whole contextual regions that were originally undefined in the prior segmentation scheme, and the object-oriented map could increase the accuracy of Color-Guided Depth Estimation step S722 illustrated in FIG. 7 and FIG. 8B.

The processor would then segment the 2D-30 Hz RGB image (C) based on the object information of the 2D-30 Hz RGB image (C) to generate the second segmentation result (i.e. Object-based Segment Map ($S_o$) illustrated in FIG. 8C). In detail, all pixels in the 2D-30 Hz RGB image (C) are segmented on different regions based on the object information, wherein the object information includes car, traffic cone, scooter, pedestrian, sky, road and other common object classes. The second segmentation result (i.e. Object-based Segment Map ($S_o$)) is denoted as a plurality of object segmentations. Each of object segmentations relies set of RGB pixels from 2D-30 Hz RGB image (C) that denotes similar object. The second segmentation algorithm is, for example, a fully convolutional network (FCN) technique.

It is noted that in other embodiment, the processor could directly process the Color-based Segmentation step S712a and the Object-based Segmentation step S712b with the first sensor data (i.e. RGB image data) which is generated by the RGB camera array 701 in the RGB Image Data step S710, and no more limitation here, FIG. 7 is merely an example, and constructs no limitations to the present invention.

Figure 9A:
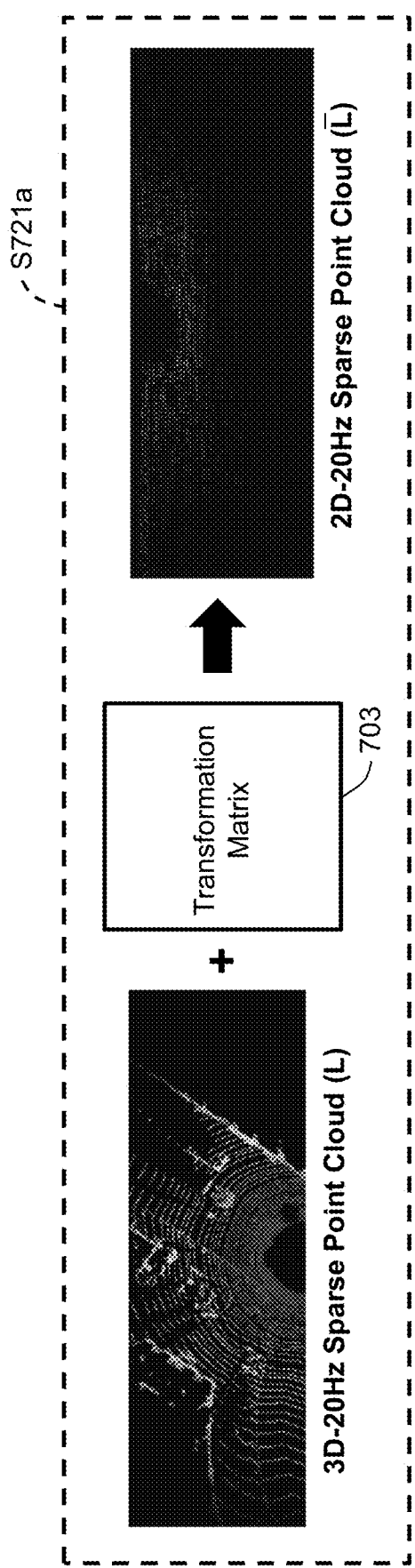
FIG. 9A~FIG. 9C illustrates a data alignment algorithm in accordance with one of the exemplary embodiments of the disclosure.
Figure 9B:
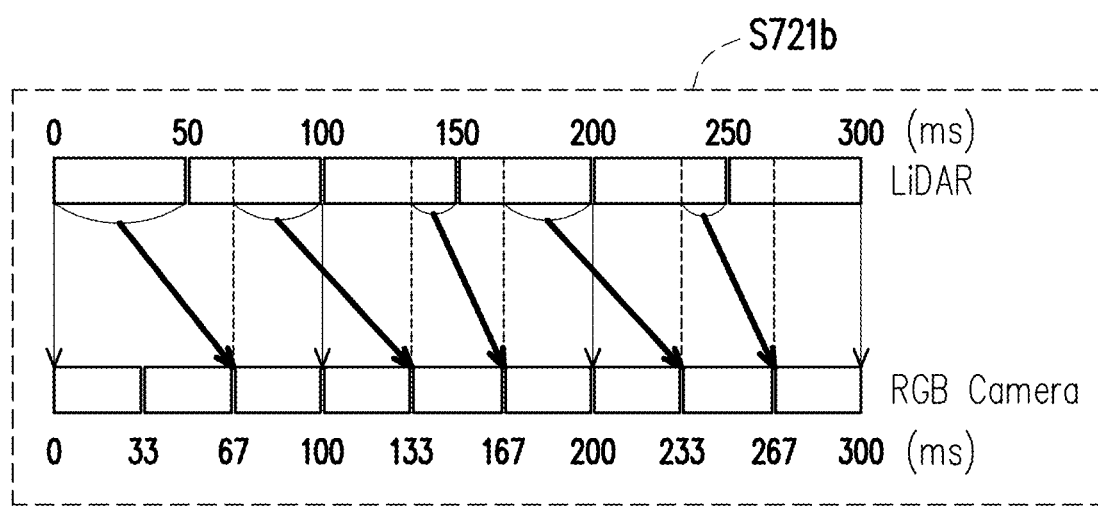
Figure 9C:
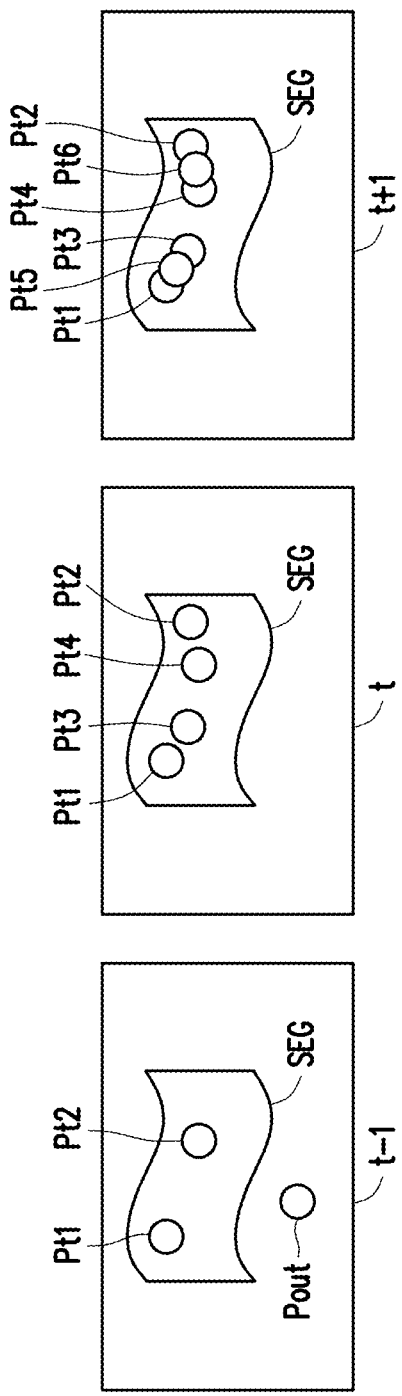

FIG. 9A~FIG. 9C illustrates a data alignment algorithm in accordance with one of the exemplary embodiments of the disclosure. With reference to FIG. 7 and FIG. 9A~FIG. 9C, the processor would synchronize parameters of the first segmentation result and parameters of the second sensor data by using a data alignment algorithm to generate a synchronized second sensor data, wherein the data alignment algorithm comprises Spatial Alignment step S721a (as illustrated in FIG. 7 and FIG. 9A) and Temporal Alignment step S721b (as illustrated in FIG. 7 and FIG. 9B~FIG. 9C). In detail, the data alignment algorithm comprises: aligning a spatial parameter of the second sensor data by using a transformation matrix 703 to generate an aligned second sensor data, and aligning a temporal parameter of the first segmentation result and a temporal parameter of the aligned second sensor data by using a temporal alignment algorithm.

To be more specific, the processor would align a spatial parameter of the second sensor data (e.g. 3D-20 Hz Sparse Point Cloud (L) illustrated in FIG. 9A) by using a transfonnation matrix 703 (as illustrated in of FIG. 7 and FIG. 9A). In other words, the processor would convert the second sensor data from a 3D data to a 2D data with the transformation matrix 703, and generate an aligned second sensor data (i.e. the 2D-20 Hz Sparse Point Cloud (L) illustrated in FIG. 9A) by a pinhole image principle. In detail, the depth based preprocessing would require one or more active 3D depth sensor (i.e. the LiDAR transducer array 702) with FOV at 360 degrees and sampling rate at a frequency fL (e.g. 20 Hz). To synchronize the data between the depth-based sensors (i.e. the LiDAR transducer array 702) and RGB-based sensors (i.e. the RGB camera array 701), the spatial information (or coordinate system) of the sparse 3D point clouds volume data (e.g. ($L^T=[L_x, L_y, L_z]$)) should be synchronized with the dense 2D RGB image from the RGB-based sensor (e.g. ($C^T=[C_i, C_j]$)).

The mapping of the second sensor (e.g. 3D-20 Hz Sparse Point Cloud (L) illustrated in FIG. 9A) is performed exclusively on point clouds that are located within the FOV of the 2D-30 Hz RGB image (C). The data alignment algorithm uses rotational matrix of the transformation matrix 703 as:

$$\begin{bmatrix} A_0 \\ A_1 \\ A_2 \end{bmatrix} = \begin{bmatrix} R_0 & R_1 & R_2 \\ R_3 & R_4 & R_5 \\ R_6 & R_7 & R_8 \end{bmatrix} \times \begin{bmatrix} L_x \\ L_y \\ L_z \end{bmatrix}. \quad (1)$$

Furthermore, the acquired points are further replaced based on the translational matrix as:

$$\begin{bmatrix} B_0 \\ B_1 \\ B_2 \end{bmatrix} = \begin{bmatrix} t_0 \\ t_1 \\ t_2 \end{bmatrix} + \begin{bmatrix} A_0 \\ A_1 \\ A_2 \end{bmatrix}. \quad (2)$$

Later, the acquired points are transformed according to the available intrinsic metric, which was acquired using image rectification as:

$$\begin{bmatrix} X' \\ Y' \\ Z' \end{bmatrix} = \begin{bmatrix} P_0 & P_1 & P_2 \\ P_3 & P_4 & P_5 \\ P_6 & P_7 & P_8 \end{bmatrix} \times \begin{bmatrix} B_0 \\ B_1 \\ B_2 \end{bmatrix}. \quad (3)$$

Finally, the acquired points are processed to obtain the desired two-dimensional representation of the raw point cloud data:

$$\overline{L_i} = \frac{X'}{Z'} \text{ and } \overline{L_j} = \frac{Y'}{Z'}. \quad (4)$$

Additionally, the processor would align a temporal parameter of the first segmentation result (i.e. Color-based Segment Map ($S_c$) illustrated in FIG. 8B) and a temporal parameter of the aligned second sensor data (i.e. 2D-20 Hz Sparse Point Cloud (L) illustrated in FIG. 9A) by using a temporal alignment algorithm to generate a synchronized second sensor data. The temporal alignment algorithm comprises: synchronizing a sampling rate of the first segmentation result and a sampling rate of the aligned second sensor data. In detail, the sampling rate of the LiDAR transducer array 702 is smaller than the sampling rate of the RGB camera array 701.

In general, the LiDAR transducer array 702 has the sampling rate at frequency fL (e.g. 20 Hz), and the sampling rate of the RGB camera array 701 can up to frequency fC (e.g. 30 Hz). This condition shows that a synchronization technique is required to up-sample the data of the LiDAR transducer array 702 from 20 Hz to 30 Hz. So, the processor would synchronize the sampling rate of the first segmentation result and a sampling rate of the aligned second sensor data.

An interpolation technique of the temporal alignment algorithm is illustrated in FIG. 9B. According to FIG. 9B, the LiDAR transducer array 702 can take one point cloud volume every 50 millisecond (ms), so the LiDAR transducer array 702 can take point cloud volumes at time 0 ms, 50 ms, 100 ms, 150 ms, 200 ms, 250 ms, and 300 ms (as illustrated in FIG. 9B). The RGB camera array 701 can take one image every 33 ms, so the RGB camera array 701 can take images at time 0 ms, 33 ms, 67 ms, 100 ms, 133 ms, 167*ms*, 200 ms, 233 ms, 267 ms, and 300 ms (as illustrated in FIG. 9B). The processor could synchronize the images that were taken at the same time (i.e. 0 ms, 100 ms, 200 ms, 300 ms) directly.

Then, the processor would perform the interpolation technique on the previous two data of the LiDAR transducer array 702. In other words, the processor would process the data of the LiDAR transducer array 702 that were taken in the different time point. The processor would use an image which was taken by the LiDAR transducer array 702 from time at 0 ms and 50 ms to generate an image of the LiDAR transducer array 702 at time 67 ms. The processor then would use an image which was taken by the LiDAR transducer array 702 from time at 67 ms and 100 ms to generate an image of the LiDAR transducer array 702 at time 133 ms, and so on to generate an image at time 167 ms, an image at time 233 ms, and an image at time 267 ms. After that, the processor would start to synchronize the Color-based Segment Map (Se) and the 3D-20 Hz Sparse Point Cloud (L) based on the time difference of the autonomous vehicle and the amount of motion of the autonomous vehicle.

As illustrated in FIG. 9C, the processor would take the account of the movement possibilities of autonomous vehicle and the surrounding objects to perform the interpolation. In detail, in the interpolation technique of the temporal alignment algorithm, the processor would recognize the set of point clouds (e.g. point Pt1~Pt2) in each of the segmentations (e.g. segment SEG) in the aligned second sensor data (i.e. the 2D-20 Hz Sparse Point Cloud (L) illustrated in FIG. 9A) on every frame (e.g. frame t−1, frame t) with newly acquired point cloud volume ($\overline{L}(s_c, t)$) where t denotes the time index of image data, wherein only a part of segments may include a plurality of point clouds. In other words, each of the segment SEG represents one of the segments with the plurality of point clouds. It is noted that in other embodiment, it could be each of the plurality of segments include a plurality of point clouds, the persons skilled in the art can adaptively adjust according to actual situations and requirements. The processor would filter a point which is different from the point in the segment SEG (e.g. point Pout), because the point Pout and the segment SEG are at different object. The processor then would pair up each point cloud in $\overline{L}(s_c, t)$ (e.g. point Pt3, Pt4) with each point cloud in $\overline{L}(s_c, t−1)$ (e.g. point Pt1, Pt2) by finding the minimum Euclidean distance between the paired point clouds as:

$$\min_{s \in \overline{L}(s_c, t-1)} \sqrt{\frac{(\overline{L}_i(s,t) - \overline{L}_i(s,t-1))^2 + (\overline{L}_j(s,t) - \overline{L}_j(s,t-1))^2 +}{(\overline{L}_d(s,t) - \overline{L}_d(s,t-1))^2 + (\overline{L}_r(s,t) - \overline{L}_r(s,t-1))^2}}, \quad (5)$$

where $\overline{L}_d(\ )$ and $\overline{L}_r(\ )$ represent the depth and the reflectance values of each point cloud value in each of the segment SEG.

On each pair point cloud in segment SEG of first segmentation result (i.e. Color-based Segment Map ($S_c$)), new point cloud volume for t+1 (i.e. point Pt5, Pt6) is predicted as:

$$\overline{L}_x(s_C, t+1) = \overline{L}_x(s_C, t) + (w_{time} \times (\overline{L}_x(s_{C,}) - \overline{L}_x(s_C, t-1))), \quad (6)$$

$$\overline{L}_y(s_C, t+1) = \overline{L}_y(s_C, t) + (w_{time} \times (\overline{L}_y(s_{C,}) - \overline{L}_y(s_C, t-1))), \quad (7)$$

$$\overline{L}_z(s_C, t+1) = \overline{L}_z(s_C, t) + (w_{time} \times (\overline{L}_z(s_{C,}) - \overline{L}_z(s_C, t-1))), \quad (8)$$

$$\text{where } w_{time} = \frac{T_{camera}(t) - T_{LiDAR}(t)}{T_{LiDAR}(t) - T_{LiDAR}(t-1)}. \quad (9)$$

The $T_{camera}(\ )$ and $T_{LiDAR}(\ )$ represent the exact timestamp of the RGB-based sensors (i.e. the RGB camera array 701) and depth-based sensors (i.e. the LiDAR transducer array 702).

All point clouds that are originally acquired or artificially generated are remapped from a volume data of the synchronized second sensor data, where the sampling rate should already be synchronized from frequency fL (i.e. 20 Hz) to frequency fC (i.e. 30 Hz).

Figure 10A:
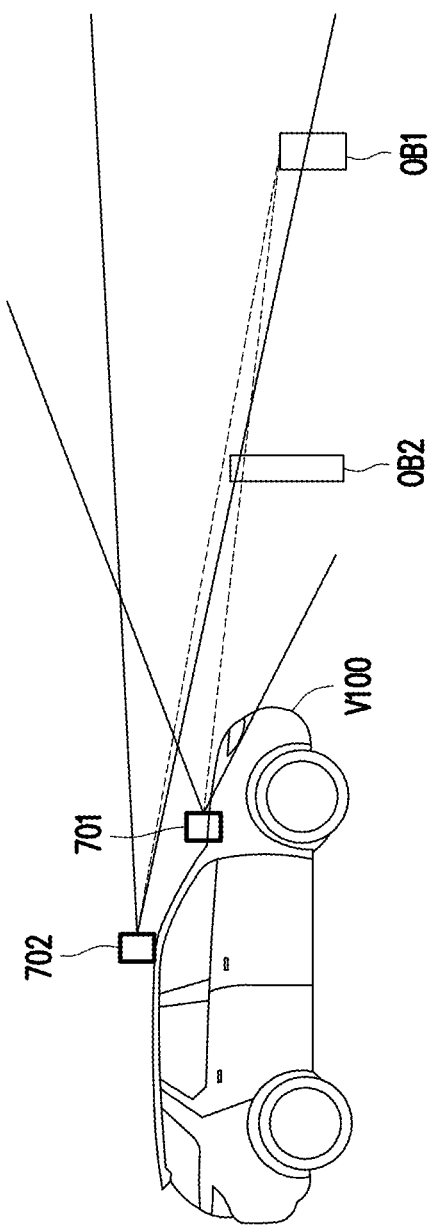
FIG. 10A~FIG. 10C illustrates an occlusion correlation algorithm in accordance with one of the exemplary embodiments of the disclosure.
Figure 10B:
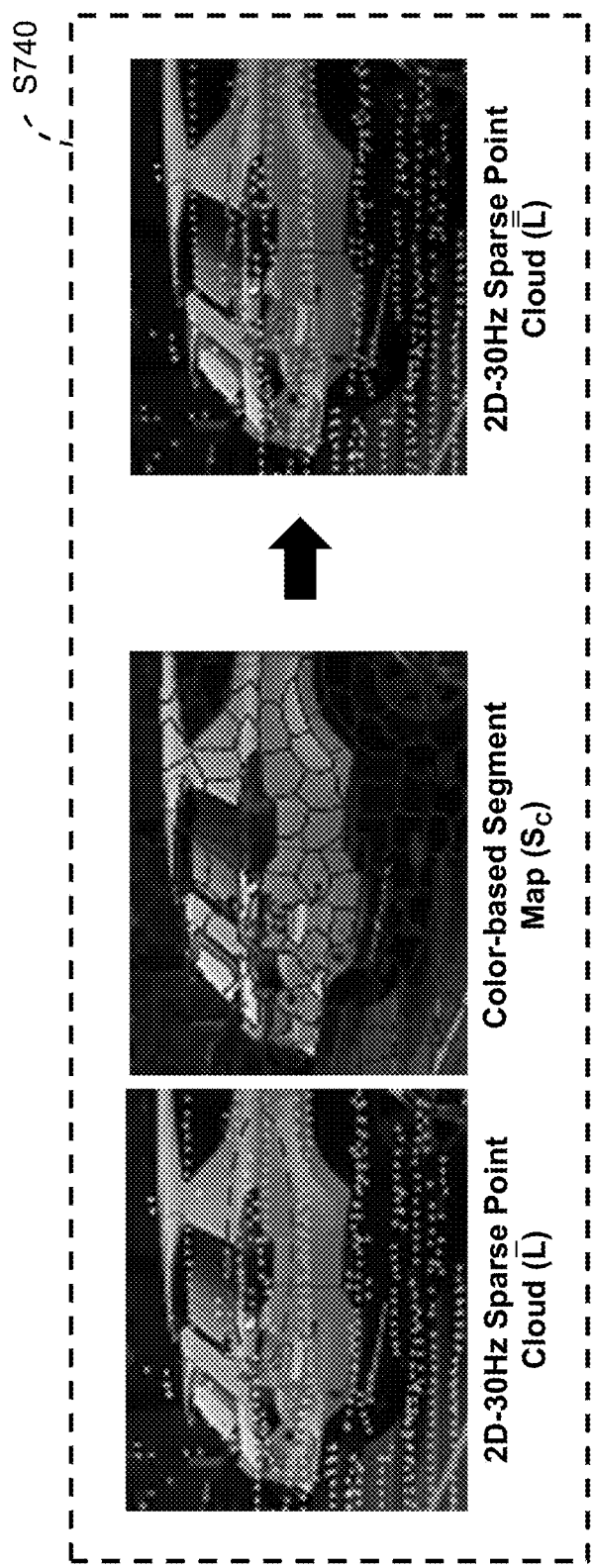
Figure 10C:
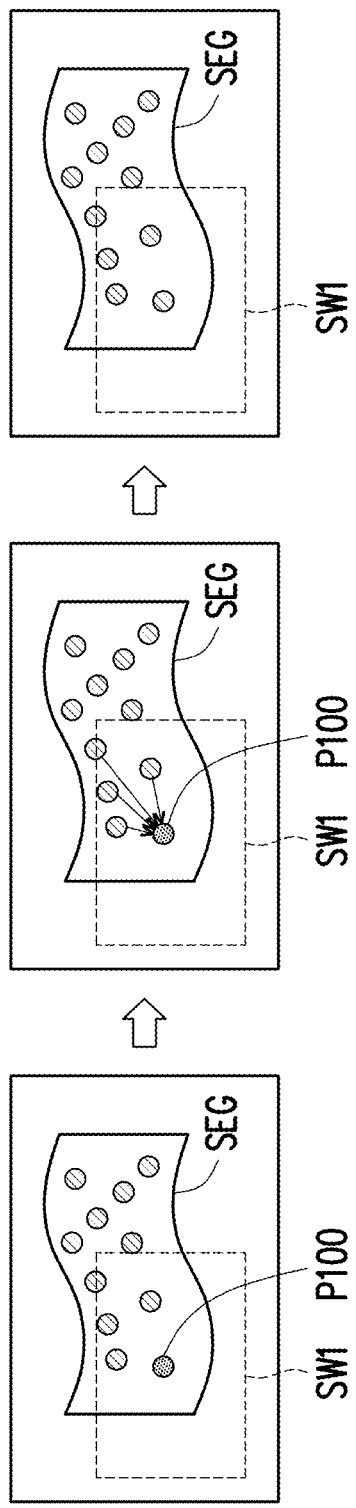

FIG. 10A~FIG. 10C illustrates an occlusion correlation algorithm in accordance with one of the exemplary embodiments of the disclosure. With reference to FIG. 7 and FIG. 10A~FIG. 10C, wherein before the step of fusing the first segmentation result and the synchronized second sensor data by using a first depth estimation algorithm to generate a first depth result (i.e. the Color-Guided Depth Estimation step S722), the processor is further configured for: processing the synchronized second sensor data by using an occlusion correlation algorithm (i.e. the Occlusion Correlation step S740), wherein the occlusion correlation algorithm comprises: scanning all segments, recognizing a set of the plurality of point clouds of each of the plurality of segments to find an occluded point and a plurality of non-occluded points in each of the part of the plurality of segments, and replacing a depth value of the occluded point with an average depth value of the plurality of non-occluded points in each of the part of the plurality of segments.

In detail, FIG. 10A illustrates setting places of the RGB camera array 701 and the LiDAR transducer array 702 with one of the exemplary embodiments of the disclosure. In this embodiment, the first type of sensor has a lower setting place than the second type of sensor, for example, the setting place of the RGB camera array 701 is set on the hood of a car V100, and the setting place of the LiDAR transducer array 702 is set on the roof of a car V100. Accordingly, a FOV of the LiDAR transducer array 702 may larger than a FOV of the RGB camera array 701, therefore the LiDAR transducer array 702 may take a point cloud volume of an object (e.g. object OB1) which is obscured by another object (e.g. object OB2), wherein the object OB2 is closer the car V100 than the object OB1. In other words, because of the occlusion of the object OB2, the RGB camera array 701 could not take the image of the object OB1. The occlusion correction corrects the point clouds that are referring to the depth beyond the object OB2 as illustrated in FIG. 10A.

So, the processor would be configured for processing the synchronized second sensor data by using an occlusion correlation algorithm. Regarding details of the occlusion correlation algorithm, the processor would process the synchronized second sensor data (i.e. 2D-30 Hz Sparse Point Cloud ($\overline{L}$) illustrated in FIG. 10B) with the first segmentation result (i.e. Color-based Segment Map ($S_c$) illustrated in FIG. 10B) to generated a 2D-30 Hz Sparse Point Cloud ($\overline{L}$) (as illustrated in FIG. 10B).

In detail, the processor would scan all segments in 2D-30 Hz Sparse Point Cloud ($\overline{L}$) by a scan window SW1 (as illustrated in FIG. 10C). For example, segment SEG is one of the plurality of segments of 2D-30 Hz Sparse Point Cloud (L̃). The processor then would recognize a set of the plurality of point clouds of each of the plurality of segments to find an occluded point (e.g. occluded point P100 in segment SEG) and a plurality of non-occluded points (e.g. other points in segment SEG) in each of the part of the plurality of segments. After that, the processor would replace a depth value of the occluded point P100 with an average depth value of the plurality of non-occluded points in each of the part of the plurality of segments in the scan window SW1. In this manner, the occluded point P100 could be correlated to be a non-occluded point, and the processor would generate the synchronized second sensor data (i.e. correlated synchronized second sensor data) in Correlated Depth Volume Data step S740a, wherein the correlated synchronized second sensor data is a sparse depth data.

Figure 11A:
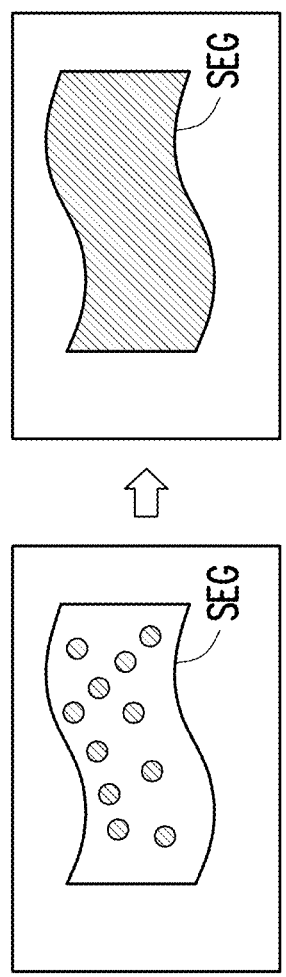
FIG. 11A~FIG. 11B illustrates a first depth estimation algorithm in accordance with one of the exemplary embodiments of the disclosure.
Figure 11B:
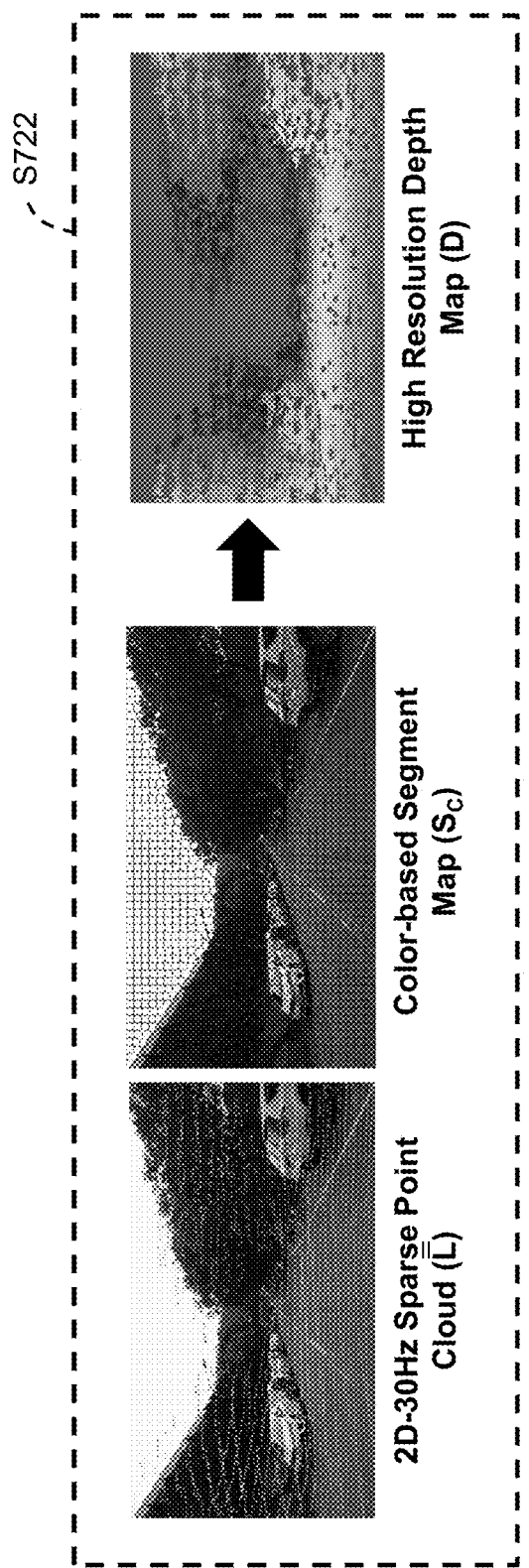

After synchronizing the spatial parameters and the temporal parameters of the parameters of the second sensor data and the first segmentation result, the depth estimation algorithm is performed. There are two executed algorithms to perform the depth estimation algorithm, a first depth estimation algorithm (i.e. Color-Guided Depth Estimation) and a second depth estimation algorithm (i.e. Object-Guided Depth Estimation). FIG. 11A~FIG. 11B illustrates a first depth estimation algorithm in accordance with one of the exemplary embodiments of the disclosure. With reference to FIG. 7 and FIG. 11A~FIG. 11B, the processor would fuse the first segmentation result and the synchronized second sensor data by using a first depth estimation algorithm to generate a first depth result in Color-Guided Depth Estimation step S722 (as illustrated in FIG. 7 and FIG. 11A FIG. 11B).

In detail, the first depth estimation algorithm comprises: calculating an average depth value of the plurality of point clouds in each of the part of the plurality of segments and filling up a depth value of each of the part of the plurality of segments with the average depth value corresponding to each of the part of the plurality of segments. To be more specific, the processor would calculate the average depth value of the plurality of point clouds (i.e. point clouds in segment SEG illustrated in FIG. 11A) in each of the part of the plurality of segments (e.g. segment SEG) in the synchronized second sensor data (e.g. 2D-30 Hz Sparse Point Cloud (L̃) illustrated in FIG. 10B).

The processor then would fill up a depth value of each of the part of the plurality of segments (i.e. segments SEG illustrated in FIG. 11A) with the average depth value corresponding to each of the part of the plurality of segments to generate a first depth result (i.e. High Resolution Depth Map (D) illustrated in FIG. 11B). In this manner, the processor could fuse the first segmentation result (i.e. Color-based Segment Map ($S_c$) illustrated in FIG. 11B) and the synchronized second sensor data (i.e. 2D-30 Hz Sparse Point Cloud (L̃) illustrated in FIG. 11B) by using a first depth estimation algorithm to generate a first depth result (i.e. High Resolution Depth Map (D) illustrated in FIG. 11B).

Figure 12A:
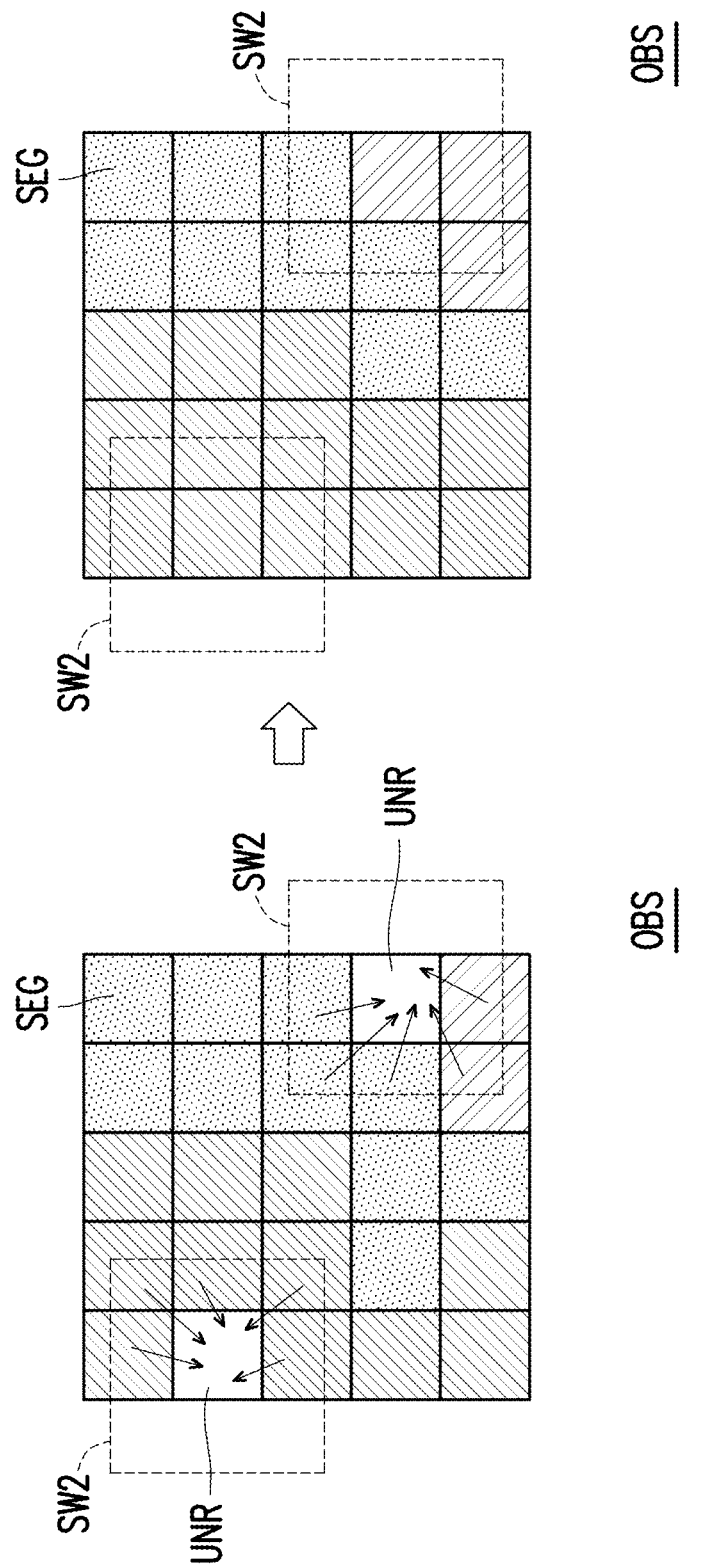
FIG. 12A~FIG. 12B illustrates a second depth estimation algorithm in accordance with one of the exemplary embodiments of the disclosure.
Figure 12B:
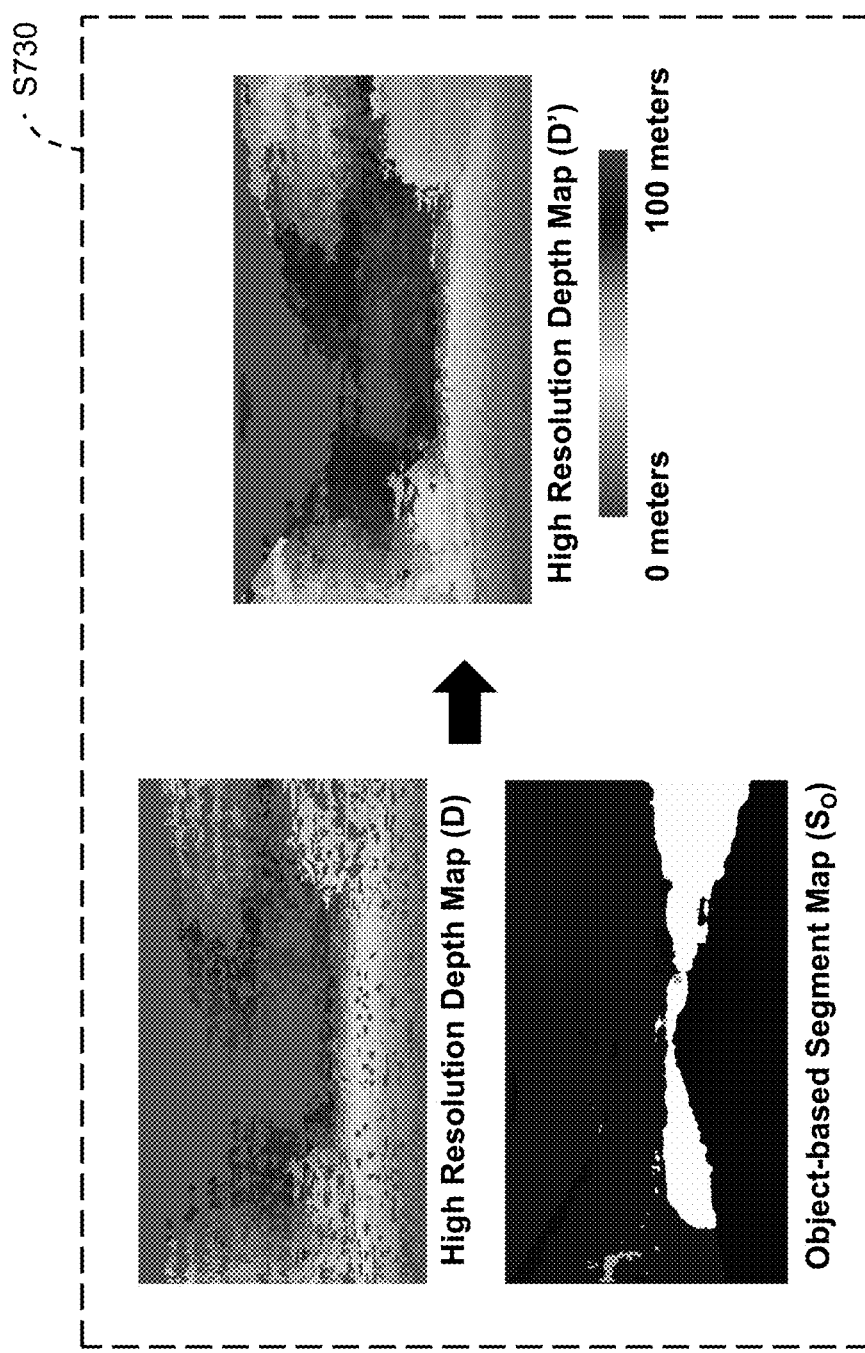

FIG. 12A~FIG. 12B illustrates a second depth estimation algorithm in accordance with one of the exemplary embodiments of the disclosure. With reference to FIG. 7 and FIG. 12A~FIG. 12B, the processor would fuse the second segmentation result and the first depth result by using a second depth estimation algorithm to generate a second depth result in Object-Guided Depth Estimation step S730 (as illustrated in FIG. 7 and FIG. 12A~FIG. 12B). In the detailed description, the second depth estimation algorithm comprises recognizing a set of the plurality of segments to find an undefined depth value region, scanning the plurality of segments to find a minimum depth value of the plurality of segments which near the undefined depth value region, and replacing a depth value of the occluded point with an average depth value of the plurality of non-occluded points in each of the plurality of segments.

To be more specific, the processor would recognize a set of the plurality of segments to find an undefined depth value region (e.g. segments of an object OBS in image illustrated in FIG. 12A) by a scan window SW2, wherein the object OBS includes a plurality of segments SEG. The processor then would scan the plurality of segments (i.e. the segments nearby the undefined depth value region UNR in image before illustrated in FIG. 12A) to find a minimum depth value of the plurality of segments which is nearby the undefined depth value region UNR. The processor would fill up a depth value of the undefined region UNR with the minimum depth value (as illustrated in FIG. 12A) to generate a second depth result (e.g. High Resolution Depth Map (D') illustrated in FIG. 12B).

In this manner, the processor could fuse the second segmentation result (i.e. Object-based Segment Map ($S_o$) illustrated in FIG. 12B) and the first depth result (i.e. High Resolution Depth Map (D) illustrated in FIG. 12B) by using a second depth estimation algorithm to generate a second depth result (i.e. High Resolution Depth Map (D') illustrated in FIG. 12B), wherein the second depth result is a dense depth data. Hence, this disclosure improves a resolution of a depth map by the RGB camera array 701, the LiDAR transducer array 702 and the processor through the image rectification algorithm, two stage segmentation algorithms, data alignment algorithm and two stage depth estimation algorithms.

Figure 13A:
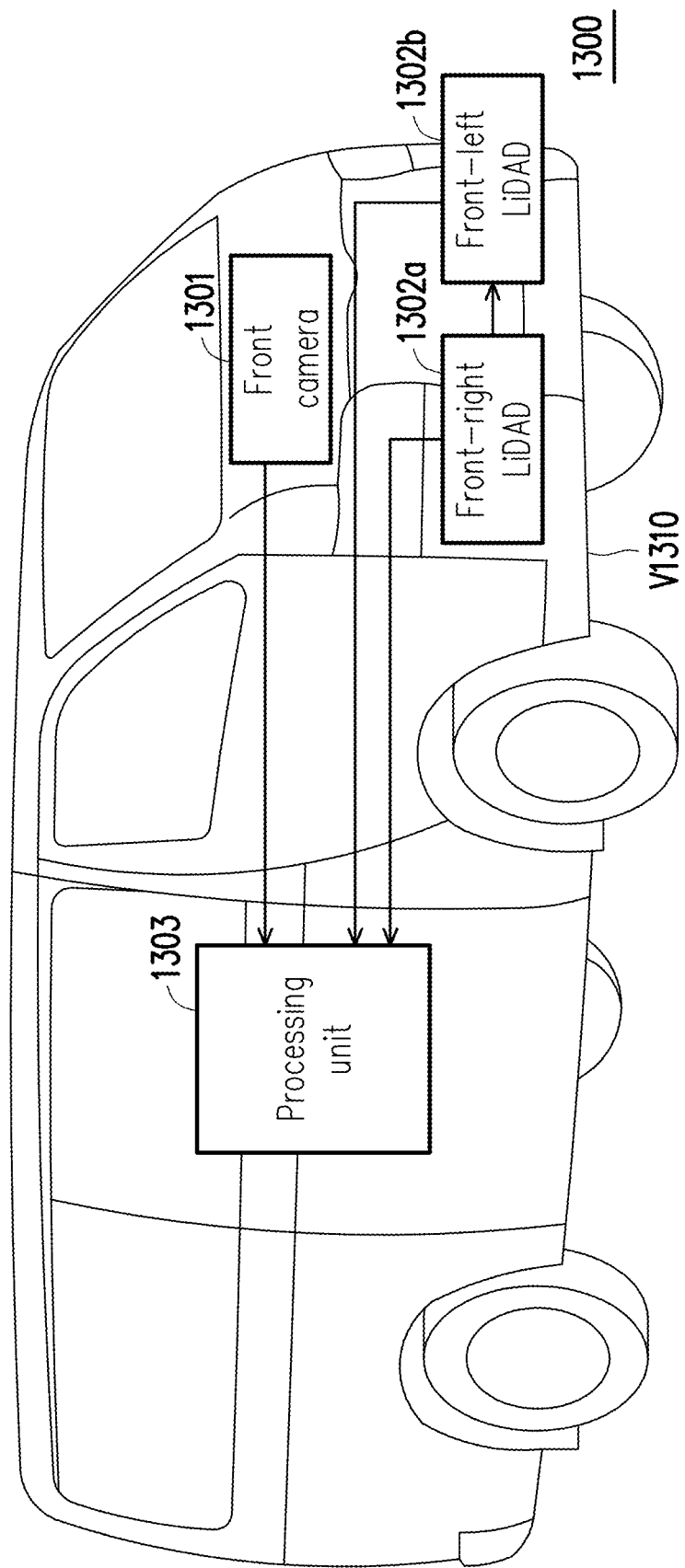
FIG. 13A~FIG. 13C illustrates another implementation example of the depth estimation method in accordance with one of the exemplary embodiments of the disclosure.
Figure 13B:
Figure 13C:
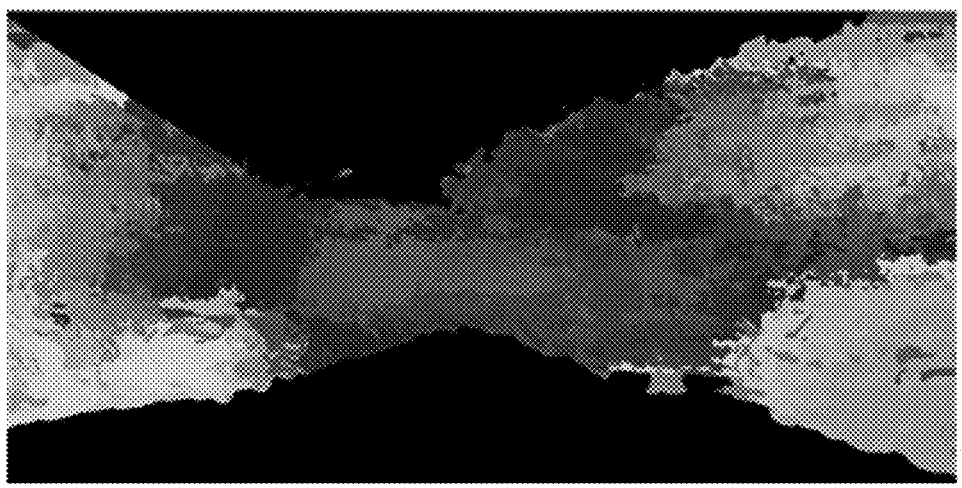

FIG. 13A~FIG. 13C illustrates another implementation example of the depth estimation method in accordance with one of the exemplary embodiments of the disclosure. An autonomous vehicle V1310 comprises depth estimation apparatus 1300. The depth estimation apparatus 1300 comprises a front-right LiDAR 1302a, a front-left LiDAR 1302a, a front camera 1301, and a processing unit 1303. The front-right LiDAR 1302a, front-left LiDAR 1302a and front camera 1301 coupled to the processing unit 1303, wherein the processing unit 1303 is, for example, a personal computer with Intel Core i7 @ 2.4 GHz 4 GB RAM and NVidia GeForce 940M 2 GB VRAM operated on Ubuntu 16.04 LTS.

Refer to FIG. 13A~FIG. 13C, the depth estimation apparatus 1300 could accurately estimate the dense depth values for the synchronized second sensor data (i.e. 2D-20 Hz Sparse LiDAR with RGB image illustrated in FIG. 13B) and estimate the dense depth values for the second depth result (i.e. 2D-30 Hz High Resolution Depth Map illustrated in FIG. 13C). Furthermore, the average complexity for the aforementioned implementation reached 26.232 fps (or 38.122 ms per frame). The complexity of the depth estimation apparatus 1300 can simply be reduced by applying limited areas of calculations for the color- and object-guided estimations such as bounding box areas. In other words, the processing unit 1303 would be configured at least for processing an image rectification algorithm to generate a rectified first sensor data, processing two stage segmentation algorithms to generate a first segmentation result and a second segmentation result, processing a data alignment algorithm to generate a synchronized second sensor data, and processing two stage depth estimation algorithms to generate a first depth result (i.e. 2D-20 Hz Sparse LiDAR with RGB image illustrated in FIG. 13B) and a second depth result (i.e. 2D-30 Hz High Resolution Depth Map illustrated in FIG. 13C).

It should be noticed that the depth estimation apparatus 1300 is identical or similar to the depth estimation apparatus depicted in FIG. 2, FIG. 5 or FIG. 7. Hence, no further description is provided herein.

FIG. 14A~FIG. 14E illustrates another implementation example of the depth estimation method in accordance with one of the exemplary embodiments of the disclosure. An autonomous vehicle V1410 comprises depth estimation apparatus 1400. The depth estimation apparatus 1400 comprises a first type of sensor (e.g. Stereo camera 1401), a second type of sensor (e.g. Velodyne Laserscanner 1402), a GPS 1404, and a processor 1403. The Velodyne Laserscanner 1402, the Stereo camera 1401, the GPS 1404 coupled to the processor 1403, wherein the processor 1403 is, for example, a personal computer with Intel Core i7 @ 2.4 GHz 4 GB RAM and NVidia GeForce 940M 2 GB VRAM operated on Ubuntu 16.04 LTS.

Figure 14A:
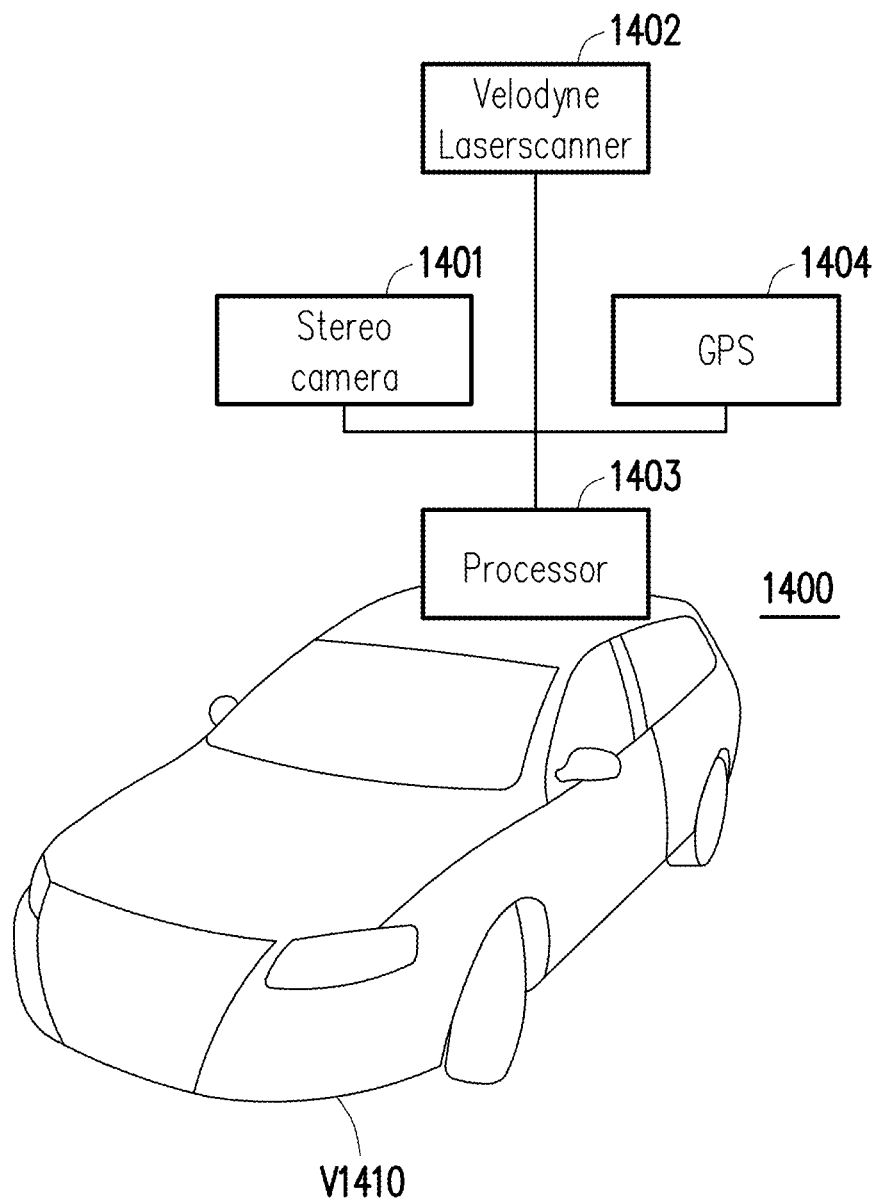
FIG. 14A~FIG. 14E illustrates another implementation example of the depth estimation method in accordance with one of the exemplary embodiments of the disclosure.
Figure 14B:
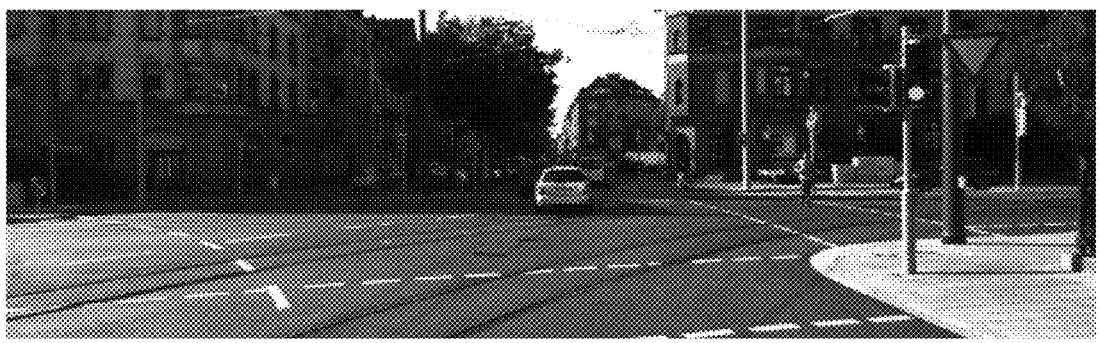
Figure 14C:
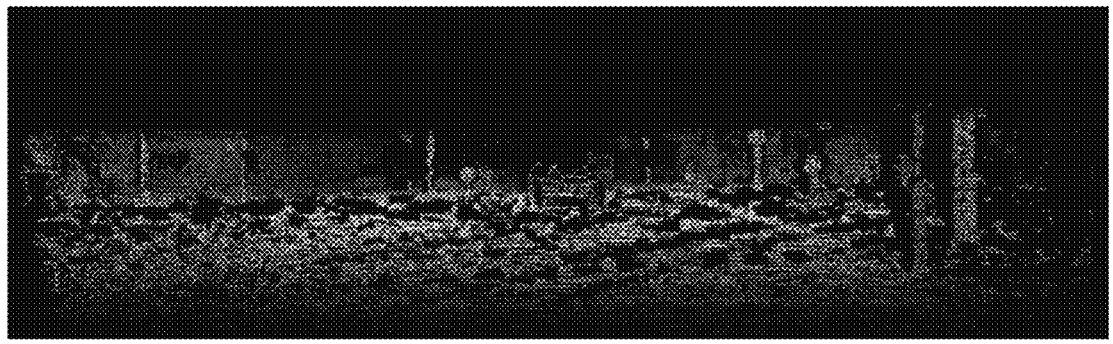
Figure 14D:
Figure 14E:
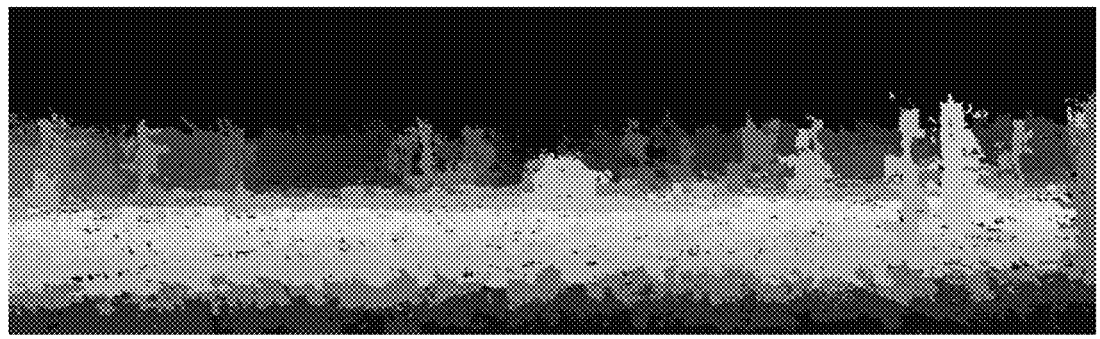

An image taken by the Stereo camera 1401 as illustrated in FIG. 14B. An image taken by the Velodyne Laserscanner 1402 as illustrated in FIG. 14C. In detail, the processor 1403 would be configured at least for processing an image rectification algorithm to generate a rectified first sensor data, processing two stage segmentation algorithms to generate a first segmentation result and a second segmentation result, processing a data alignment algorithm to generate a synchronized second sensor data, and processing two stage depth estimation algorithms to generate a first depth result (as illustrated in FIG. 14D) and a second depth result, wherein the second depth result is a dense high-resolution depth map (as illustrated in FIG. 14E).

It should be noticed that the depth estimation apparatus 1400 is identical or similar to the depth estimation apparatus depicted in FIG. 2, FIG. 5 or FIG. 7. Hence, no further description is provided herein.

In view of the aforementioned descriptions, the disclosure provides a depth estimation apparatus that is suitable for being used in an autonomous vehicle. Specifically, the purposes of the disclosure may include: improving the resolution of the depth map from each sensor by using the provided two stage segments, designing the provided two stage segments by considering characteristics of images, and providing two stage depth estimations based on color information and object information. In this way, the accuracy of the depth estimation can be improved.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A depth estimation apparatus comprising:
   a first type of sensor for generating a first sensor data;
   a second type of sensor for generating a second sensor data; and
   a processor coupled to the first type of sensor and the second type of sensor and configured at least for:
   processing the first sensor data by using a first segmentation algorithm to generate a first segmentation result and by using a second segmentation algorithm to generate a second segmentation result;
   synchronizing parameters of the first segmentation result and parameters of the second sensor data by using a data alignment algorithm to generate a synchronized second sensor data which includes a plurality of segments, wherein a part of the plurality of segments include a plurality of point clouds;
   fusing the first segmentation result and the synchronized second sensor data by using a first depth estimation algorithm to generate a first depth result; and
   fusing the second segmentation result and the first depth result by using a second depth estimation algorithm to generate a second depth result.

2. The depth estimation apparatus of claim 1, wherein the processor is configured at least for processing the first sensor data by using the first segmentation algorithm comprising:
   processing the first sensor data by using the first segmentation algorithm based on color information of the first sensor data,
   wherein the processor is configured at least for processing the first sensor data by using the second segmentation algorithm comprising:
   processing the first sensor data by using the second segmentation algorithm based on object information of the first sensor data.

3. The depth estimation apparatus of claim 1, wherein before the step of fusing the first segmentation result and the synchronized second sensor data by using a first depth estimation algorithm to generate a first depth result, the processor is further configured for:
   processing the synchronized second sensor data by using an occlusion correlation algorithm,
   wherein the occlusion correlation algorithm comprises:
   scanning all segments;
   recognizing a set of the plurality of point clouds of each of the plurality of segments to find an occluded point and a plurality of non-occluded points in each of the part of the plurality of segments; and
   replacing a depth value of the occluded point with an average depth value of the plurality of non-occluded points in each of the part of the plurality of segments.

4. The depth estimation apparatus of claim 1, wherein the first depth estimation algorithm comprises:
   calculating an average depth value of the plurality of point clouds in each of the part of the plurality of segments; and
   filling up a depth value of each of the part of the plurality of segments with the average depth value corresponding to each of the part of the plurality of segments.

5. The depth estimation apparatus of claim 1, wherein the second depth estimation algorithm comprises:
   recognizing a set of the plurality of segments to find an undefined depth value region;

scanning the plurality of segments to find a minimum depth value of the plurality of segments which near the undefined depth value region; and
filling up a depth value of the undefined region with the minimum depth value.

6. The depth estimation apparatus of claim 1, wherein the data alignment algorithm comprises:
aligning a spatial parameter of the second sensor data by using a transformation matrix to generate an aligned second sensor data; and
aligning a temporal parameter of the first segmentation result and a temporal parameter of the aligned second sensor data by using a temporal alignment algorithm to generate a synchronized second sensor data.

7. The depth estimation apparatus of claim 6, wherein the temporal alignment algorithm comprises:
synchronizing a sampling rate of the first segmentation result and a sampling rate of the aligned second sensor data.

8. The depth estimation apparatus of claim 1, wherein the first type of sensor has a lower setting place than the second type of sensor.

9. The depth estimation apparatus of claim 1, wherein the first type of sensor comprises a camera, and the second type of sensor comprises a LiDAR sensor.

10. The depth estimation apparatus of claim 1, wherein before the step of processing the first sensor data by using the first segmentation algorithm to generate the first segmentation result and by using the second segmentation algorithm to generate the second segmentation result, the processor is further configured for:
processing the first sensor data by using an image rectification algorithm to remove a spatial distortion of the first sensor data.

11. An autonomous vehicle comprising:
depth estimation apparatus comprising:
a first type of sensor for generating a first sensor data;
a second type of sensor for generating a second sensor data; and
a processor coupled to the first type of sensor and the second type of sensor and configured at least for:
processing the first sensor data by using a first segmentation algorithm to generate a first segmentation result and by using a second segmentation algorithm to generate a second segmentation result;
synchronizing parameters of the first segmentation result and parameters of the second sensor data by using a data alignment algorithm to generate a synchronized second sensor data which includes a plurality of segments, wherein a part of the plurality of segments include a plurality of point clouds;
fusing the first segmentation result and the synchronized second sensor data by using a first depth estimation algorithm to generate a first depth result; and
fusing the second segmentation result and the first depth result by using a second depth estimation algorithm to generate a second depth result.

12. The autonomous vehicle of claim 11, the processor is configured at least for processing the first sensor data by using the first segmentation algorithm comprising:
processing the first sensor data by using the first segmentation algorithm based on color information of the first sensor data,
wherein the processor is configured at least for processing the first sensor data by using the second segmentation algorithm comprising:
processing the first sensor data by using the second segmentation algorithm based on object information of the first sensor data.

13. The autonomous vehicle of claim 11, wherein before the step of fusing the first segmentation result and the synchronized second sensor data by using a first depth estimation algorithm to generate a first depth result, the processor is further configured for:
processing the synchronized second sensor data by using an occlusion correlation algorithm,
wherein the occlusion correlation algorithm comprises:
scanning all segments;
recognizing a set of the plurality of point clouds of each of the plurality of segments to find an occluded point and a plurality of non-occluded points in each of the part of the plurality of segments; and
replacing a depth value of the occluded point with an average depth value of the plurality of non-occluded points in each of the part of the plurality of segments.

14. A depth estimation method used by an autonomous vehicle, the method comprising:
generating, by using a first type of sensor, a first sensor data;
generating, by using a second type of sensor, a second sensor data;
processing the first sensor data by using a first segmentation algorithm to generate a first segmentation result and by using a second segmentation algorithm to generate a second segmentation result;
synchronizing parameters of the first segmentation result and parameters of the second sensor data by using a data alignment algorithm to generate a synchronized second sensor data which includes a plurality of segments, wherein a part of the plurality of segments include a plurality of point clouds;
fusing the first segmentation result and the synchronized second sensor data by using a first depth estimation algorithm to generate a first depth result; and
fusing the second segmentation result and the first depth result by using a second depth estimation algorithm to generate a second depth result.

15. The depth estimation method of claim 14, wherein the processor is configured at least for processing the first sensor data by using the first segmentation algorithm comprising:
processing the first sensor data by using the first segmentation algorithm based on color information of the first sensor data,
wherein the processor is configured at least for processing the first sensor data by using the second segmentation algorithm comprising:
processing the first sensor data by using the second segmentation algorithm based on object information of the first sensor data.

16. The depth estimation method of claim 14, wherein before the step of fusing the first segmentation result and the synchronized second sensor data by using a first depth estimation algorithm to generate a first depth result, the depth estimation method further comprising:
processing the synchronized second sensor data by using an occlusion correlation algorithm,
wherein the occlusion correlation algorithm comprises:
scanning all segments;
recognizing a set of the plurality of point clouds of each of the plurality of segments to find an occluded point and a plurality of non-occluded points in each of the part of the plurality of segments; and replacing a depth value of the occluded point with an average depth value of the plurality of non-occluded points in each of the part of the plurality of segments.

17. The depth estimation method of claim 14, wherein the first depth estimation algorithm comprises:

calculating an average depth value of the plurality of point clouds in each of the part of the plurality of segments; and filling up a depth value of each of the part of the plurality of segments with the average depth value corresponding to each of the part of the plurality of segments.

18. The depth estimation method of claim 14, wherein the second depth estimation algorithm comprises:

recognizing a set of the plurality of segments to find an undefined depth value region;

scanning the plurality of segments to find the minimum depth value of the plurality of segments which near the undefined depth value region; and filling up a depth value of the undefined region with the minimum depth value.

19. The depth estimation method of claim 14, wherein the data alignment algorithm comprises:

aligning a spatial parameter of the second sensor data by using a transformation matrix to generate an aligned second sensor data; and aligning a temporal parameter of the first segmentation result and a temporal parameter of the aligned second sensor data by using a temporal alignment algorithm to generate a synchronized second sensor data.

20. The depth estimation method of claim 19, wherein the temporal alignment algorithm comprises:

synchronizing a sampling rate of the first segmentation result and a sampling rate of the aligned second sensor data.

21. The depth estimation method of claim 14, wherein the first type of sensor has a lower setting place than the second type of sensor.

22. The depth estimation method of claim 14, wherein before the step of processing the first sensor data by using the first segmentation algorithm to generate the first segmentation result and by using the second segmentation algorithm to generate the second segmentation result, the depth estimation method further comprising:

processing the first sensor data by using an image rectification algorithm to remove a spatial distortion of the first sensor data.

* * * * *